(12) United States Patent
Holmberg et al.

(10) Patent No.: US 9,870,002 B1
(45) Date of Patent: Jan. 16, 2018

(54) VELOCITY CONTROL OF POSITION-CONTROLLED MOTOR CONTROLLERS

(71) Applicant: X Development LLC, Mountain View, CA (US)

(72) Inventors: Robert Holmberg, Mountain View, CA (US); Jared Russell, San Francisco, CA (US); Ethan Rublee, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/257,066

(22) Filed: Sep. 6, 2016

(51) Int. Cl.
| | | |
|---|---|---|
| *G05D 1/00* | (2006.01) | |
| *G05B 6/00* | (2006.01) | |
| *B25J 9/00* | (2006.01) | |
| *G05B 19/00* | (2006.01) | |
| *G05B 6/02* | (2006.01) | |
| *B25J 9/16* | (2006.01) | |
| *G05B 19/18* | (2006.01) | |

(52) U.S. Cl.
CPC .......... *G05D 1/0088* (2013.01); *B25J 9/1651* (2013.01); *G05B 6/02* (2013.01); *G05B 19/00* (2013.01); *G05B 19/18* (2013.01); *Y10S 901/01* (2013.01)

(58) Field of Classification Search
CPC .... G05D 1/00; G05B 6/00; G05B 6/02; B25J 9/00; B25J 9/1651
See application file for complete search history.

(56) References Cited

U.S. PATENT DOCUMENTS

| | | | | |
|---|---|---|---|---|
| 4,353,019 A | * | 10/1982 | Sweeney, Jr. .......... | G05B 19/23 318/561 |
| 4,571,530 A | * | 2/1986 | Sweeney, Jr. ...... | G05B 19/4163 318/593 |
| 4,651,073 A | * | 3/1987 | Shimizu ............... | G05B 19/358 318/369 |
| 4,710,865 A | * | 12/1987 | Higomura ............ | G05B 19/232 318/592 |

(Continued)

OTHER PUBLICATIONS

Mhase et al., Integrated Speed—Position Tracking with Trajectory Generation and Synchronization for 2—Axis DC Motion Control, International Journal of Engineering Research and Development, vol. 1, Issue 6 (Jun. 2012), pp. 61-66.

*Primary Examiner* — Yonel Beaulieu
(74) *Attorney, Agent, or Firm* — McDonnell Boehnen Hulbert & Berghoff LLP

(57) ABSTRACT

An example system may include a motor, a position-controlled motor controller configured to drive the motor to a commanded position with a characteristic acceleration profile, and a control system. The control system may be configured to determine a target velocity for the motor. The control system may be additionally configured to determine a target position that, when commanded to the motor controller, is predicted to cause the motor controller to drive the motor with the target velocity at a target time point by driving the motor with the characteristic acceleration profile. Further, the control system may be configured to provide an instruction for execution by the position-controlled motor controller, the instruction may be configured to cause the motor controller to drive the motor to the target position.

20 Claims, 15 Drawing Sheets

(56) References Cited

U.S. PATENT DOCUMENTS

| | | | |
|---|---|---|---|
| 5,010,282 A * | 4/1991 | Moberg | H02P 6/08 |
| | | | 318/400.04 |
| 5,249,118 A | 9/1993 | Smith | |
| 5,331,264 A | 7/1994 | Cheng et al. | |
| 6,002,234 A | 12/1999 | Ohm et al. | |
| 6,194,856 B1 | 2/2001 | Kobayashi et al. | |
| 8,415,913 B2 * | 4/2013 | Shimizu | G03B 5/02 |
| | | | 318/490 |
| 8,508,160 B2 | 8/2013 | Shoda et al. | |
| 2011/0292226 A1 * | 12/2011 | Shimizu | G03B 5/02 |
| | | | 348/208.4 |

* cited by examiner

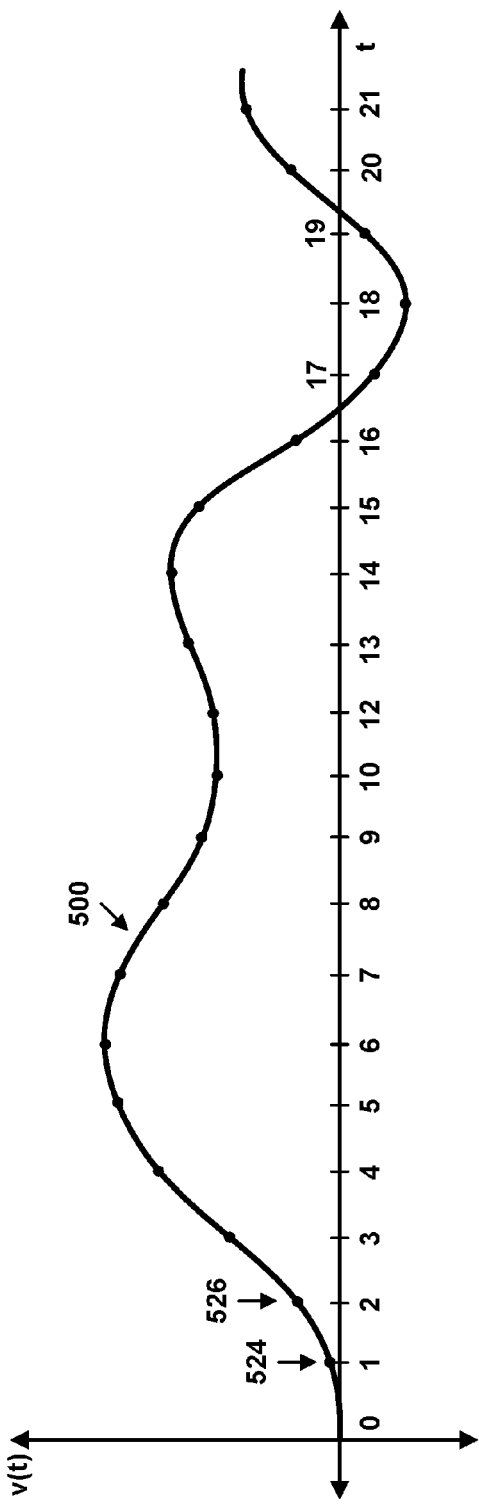
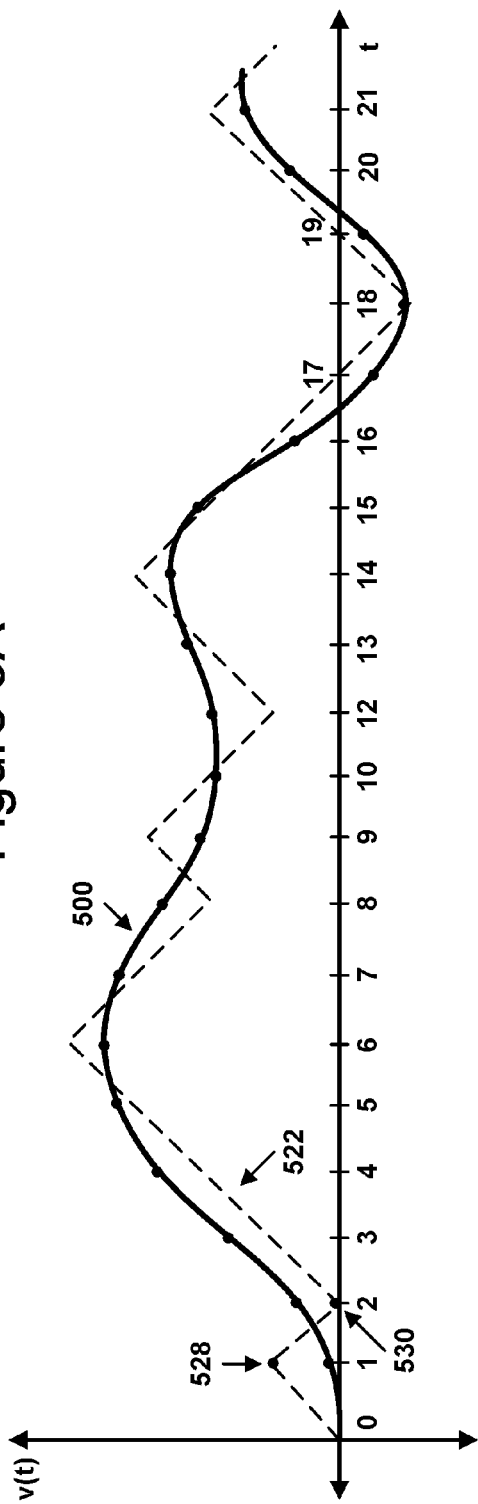
Figure 5A
Figure 5B

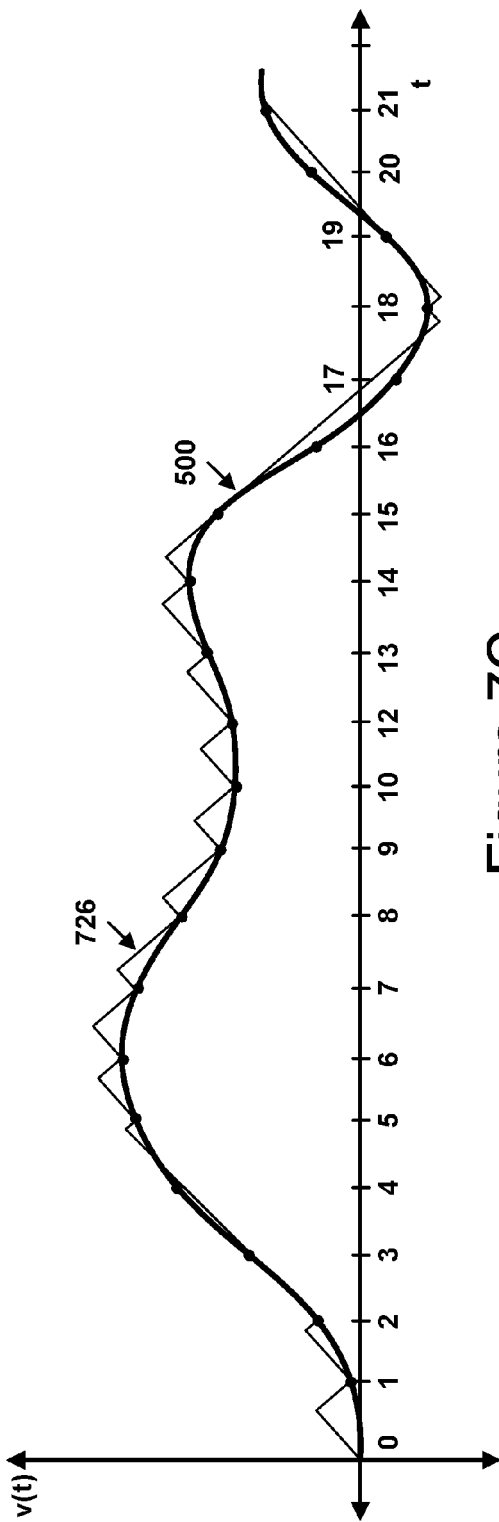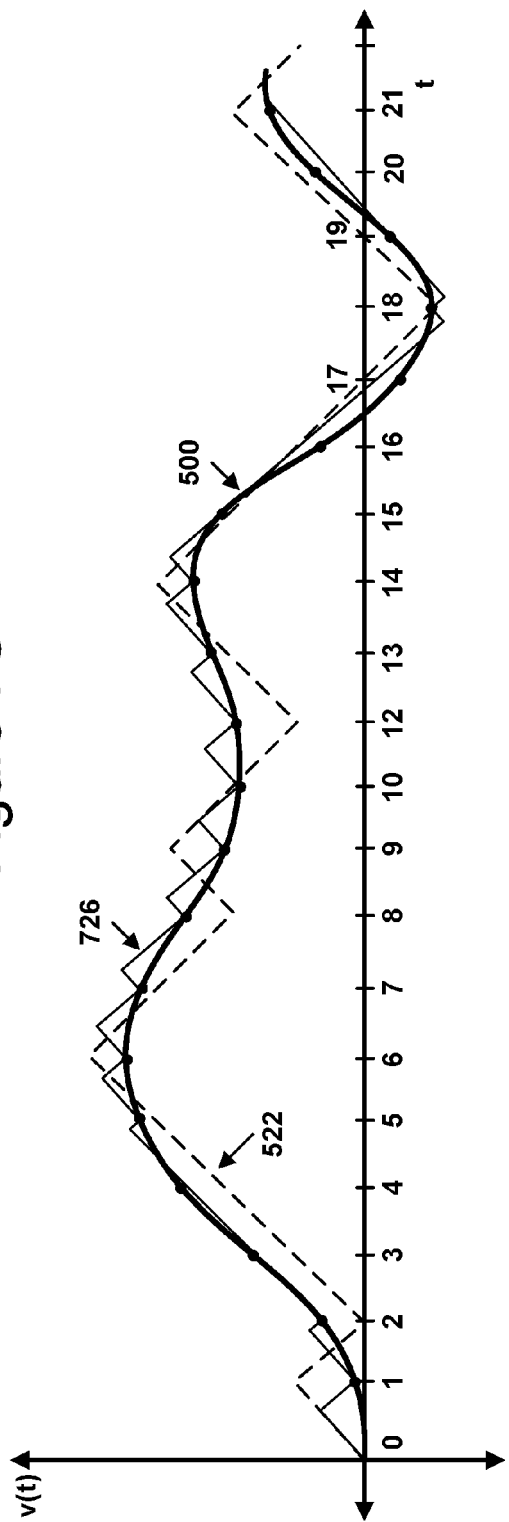
Figure 7C
Figure 7D

VELOCITY CONTROL OF POSITION-CONTROLLED MOTOR CONTROLLERS

BACKGROUND

Feedback controllers used for controlling motor systems accept as input a command signal indicating a desired motor output parameter value and a feedback signal indicating the actual, measured motor output parameter value. For example, a position-controlled motor controller accepts as input a desired position of the motor and a feedback signal indicating the actual position of the motor. The feedback controller computes the difference between the desired parameter value and the actual parameter value. The feedback controller then drives the motor with a current that is a function of the computed difference.

SUMMARY

Example embodiments include systems and operations for spoofing, mimicking, imitating, and/or otherwise achieving velocity control of a motor using a position-controlled motor controller. The position-controlled motor controller may be configured to drive the motor to commanded positions with a characteristic motion profile. The characteristic motion profile may include a characteristic acceleration profile. Based on the characteristic motion profile, a target position may be determined for the motor. The target position, when commanded to the position-controlled motor controller, may cause the motor controller to drive the motor with a target velocity at a target time point. By determining a sequence of such target positions and commanding the sequence to the position-controlled motor controller at specific time points, the motor may be driven according to a commanded (i.e., desired) velocity profile.

In one example, a method is provided that includes determining a target velocity for a motor, where a position-controlled motor controller is configured to drive the motor to a commanded position with a characteristic acceleration profile. The method also includes determining a target position that, when commanded to the motor controller, is predicted to cause the motor controller to drive the motor with the target velocity at a target time point by driving the motor with the characteristic acceleration profile. The method additionally includes providing an instruction for execution by the position-controlled motor controller, the instruction configured to cause the position-controlled motor controller to drive the motor to the target position.

In another example, a non-transitory computer readable storage medium is provided having stored thereon instructions that, when executed by a computing device, cause the computing device to perform operations. The operations include determining a target velocity for a motor, where a position-controlled motor controller is configured to drive the motor to a commanded position with a characteristic acceleration profile. The operations also include determining a target position that, when commanded to the motor controller, is predicted to cause the motor controller to drive the motor with the target velocity at a target time point by driving the motor with the characteristic acceleration profile. The operations additionally include providing an instruction for execution by the position-controlled motor controller, the instruction configured to cause the position-controlled motor controller to drive the motor to the target position.

In an additional example, a system is provided that includes a motor, a position-controlled motor controller configured to drive the motor to a commanded position with a characteristic acceleration profile, and a control system. The control system is configured to determine a target velocity for the motor. The control system is additionally configured to determine a target position that, when commanded to the motor controller, is predicted to cause the motor controller to drive the motor with the target velocity at a target time point by driving the motor with the characteristic acceleration profile. The control system is further configured to provide an instruction for execution by the position-controlled motor controller, the instruction configured cause the position-controlled motor controller to drive the motor to the target position.

In a further example, a system is provided that includes a motor, a position-controlled motor controller configured to drive the motor to a commanded position with a characteristic acceleration profile, and a control means. The control means is configured to determine a target velocity for the motor. The control means is additionally configured to determine a target position that, when commanded to the motor controller, is predicted to cause the motor controller to drive the motor with the target velocity at a target time point by driving the motor with the characteristic acceleration profile. The control means is further configured to provide an instruction for execution by the position-controlled motor controller, the instruction configured to cause the position-controlled motor controller to drive the motor to the target position.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 5A illustrates a commanded velocity profile, according to an example embodiment.

FIG. 5B illustrates an approximation of a commanded velocity profile, according to an example embodiment.

FIG. 7C illustrates an actual motor velocity profile tracking a commanded velocity profile, according to an example embodiment.

FIG. 7D illustrates a comparison between two different actual motor velocity profiles tracking a commanded velocity profile, according to an example embodiment.

DETAILED DESCRIPTION

Figure 1:
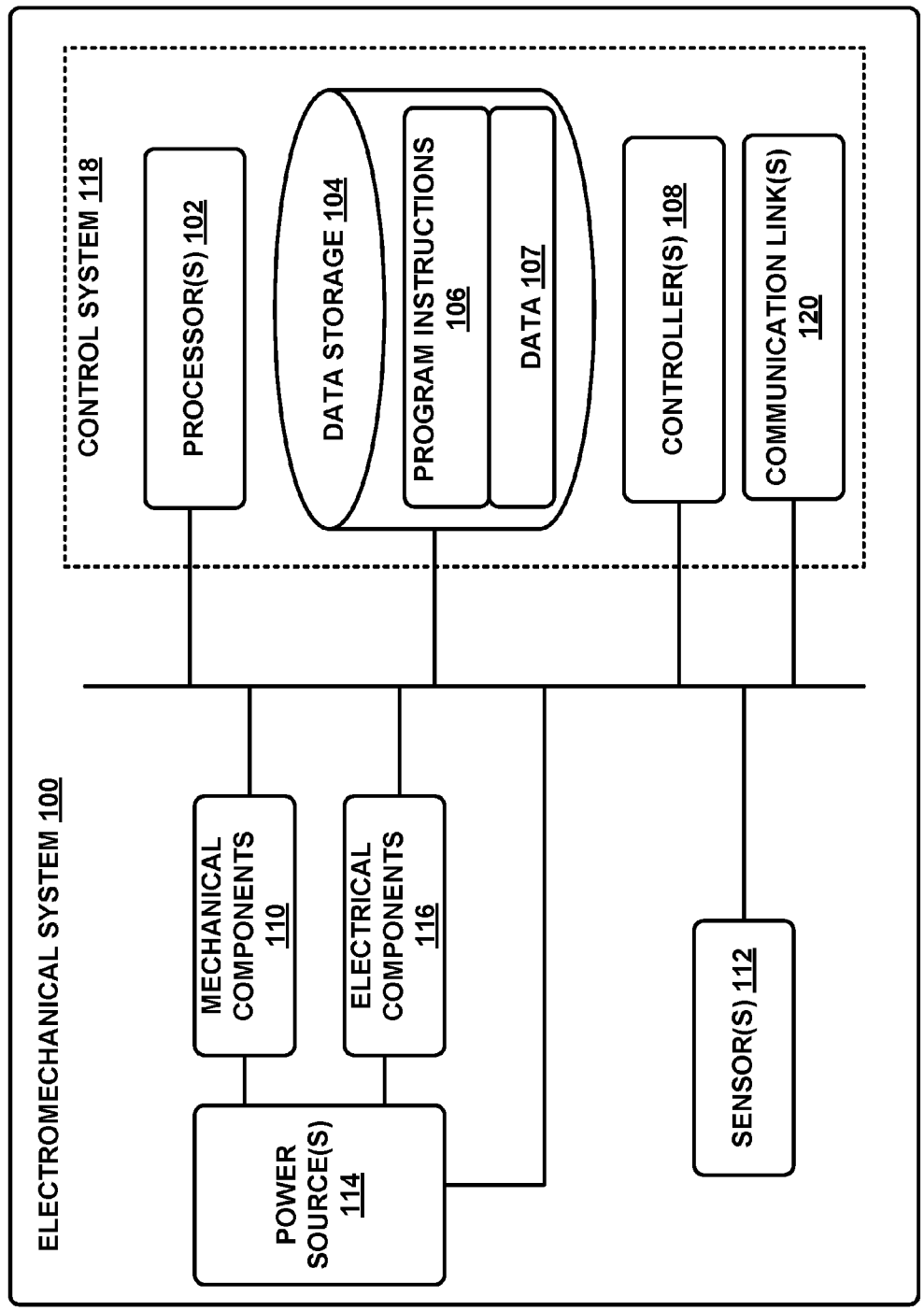
FIG. 1 illustrates a block diagram of an electromechanical system, according to an example embodiment.

The following detailed description describes various features and operations of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, aspects of the present disclosure, as generally described herein and illustrated in the figures, can be arranged, substituted, combined, separated, and designed in a wide variety of different configurations.

In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein. Further, unless otherwise noted, figures are not drawn to scale and are used for illustrative purposes only. Moreover, the figures are representational only and not all components are shown. For example, additional structural or restraining components might not be shown.

I. Overview

Motor controllers may be used for controlling a motor according to one or more desired performance parameters. For example, a motor may be controlled to generate a desired torque, rotate with a desired speed, and/or rotate to a desired angular position. Motor controllers may operate in open loop and/or closed loop configurations. In an open-loop configuration, the motor controller may drive the motor with a current or current profile based on a command provided to the motor controller. The provided command may be indicative of a performance parameter such as position, velocity, or torque. In a closed-loop configuration, the motor controller may drive the motor with a current or current profile based on a difference between the command provided to the motor and a measurement of the actual motor performance parameter (e.g., based on an error signal).

For example, a position-controlled motor controller may accept as input a desired position of the motor and a feedback signal indicating the actual position of the motor. The feedback controller may compute the difference between the desired parameter value and the actual parameter value. The feedback controller may then drive the motor with a current or current profile that is a function of the computed difference. The computed difference may be referred to as an error signal. The function of the error signal may be, for example, a multiplication of the error signal by a value (e.g., proportional control), a multiplication of a derivative of the error signal by a value (e.g., derivative control), and/or multiplication of an integral of the error signal by a value (e.g., integral control). The multiplication values may be chosen to produce a desired motor response. In other words, the motor controller may be tuned to the desired performance.

Implementing motor controller feedback systems and tuning the implemented systems for different motors across different loads may involve significant design, fabrication, and assembly time and cost. For example, implementing a velocity feedback system in hardware may require a system-level design, printed circuit board design, manufacturing, and assembly, as well as silicon-level hardware design, manufacturing, and validation. Even then, the system may be limited to motors of a particular size (e.g., power rating) adapted to drive loads within a specified range.

However, motor controllers implementing feedback of performance parameters (e.g., position) may be readily available off-the-shelf for motors of various sizes (e.g., configured to drive loads within various ranges). In some instances, it may be desirable or necessary to control a motor parameter not implemented in a feedback loop of a motor controller (e.g., an off-the-shelf motor controller). In other instances, it may be desirable or necessary to control a motor parameter that is not exposed or made available for user control by a motor controller. For example, it may be desirable or necessary to operate a position-controlled motor controller to drive a motor according to a commanded velocity profile. The position-controlled motor controller may include a velocity feedback loop. However, the velocity feedback loop might not be exposed for user control because, for example, there might not be any software or hardware interfaces for operating the motor controller according to a target velocity specified by a user and/or a control system external to the motor controller. Thus, the motor controller might not be configured to allow operation of the motor controller according to a user-specified commanded/desired velocity (e.g., the motor controller might only be operable in a position control mode).

In other instances, it may be desirable or necessary to control one or more motor parameters not implemented by and/or not exposed for user control by a motor controller while also controlling the motor according to one or more motor parameters implemented by, and exposed for, user control by the motor controller. For example, it may be desirable to, using a position-controlled motor controller, drive the motor to a desired position while following a desired (i.e., target) velocity profile. The position-controlled motor controller may be configured to receive and operate according to target position commands but might not be configured to receive and operate according to target velocity commands. In an example embodiment, wheels of a vehicle may include a drive axis and a steering axis, each configured to be driven by a corresponding motor. The velocity and position of the motors corresponding to the drive axis and the steering axis may be controlled in coordination with one another in order to control the speed, position, and direction of the vehicle.

Adaptation of existing motor controllers to operate according to one or more additional performance parameters not implemented by and/or exposed for user control by the motor controllers may be useful in low-cost applications as well as rapid-prototyping application requiring quick iteration times. However, the operations, systems, and embodiments herein described are equally applicable to motors, motor systems, and/or motor controllers developed from scratch and/or designed and assembled from prefabricated parts.

Example embodiments include systems and operations for driving a motor with a position-controlled motor controller at target velocity. Specifically, the systems and operations disclosed herein may simulate, spoof, or imitate velocity control and feedback using a position-controlled motor controller. In some embodiments, the position-controller motor controller might not include a velocity feedback loop. Alternatively, the position-controlled motor controller may include a velocity feedback loop but the velocity setpoint of the feedback loop might not be exposed or made available for control by a user and/or control system external to the position-controlled motor controller. Thus, the position-controlled motor controller might not be configured for operation in a velocity control mode.

The systems and operations disclosed herein may determine, based on known characteristic performance parameters and/or a characteristic motion profile of the position-controlled motor controller, target positions that, when commanded to the motor controller, are predicted to drive and/or will drive the motor with target velocities at target time points. The target velocities may be based on a commanded velocity profile. The position-controlled motor controller may be commanded to drive the motor to the determined target positions, thus driving the motor with the target velocities at corresponding target time points by driving the motor with the characteristic motion profile. The characteristic motion profile of the motor controller may include a characteristic acceleration profile with which the position-controlled motor controller is configured to drive the load to positions commanded to the motor controller as well as limits on maximum velocities with which to drive the motor.

The position-controlled motor controller may include a feedback loop configured to drive a motor to a commanded position. In particular, a position sensor such as a motor encoder may be connected to an output shaft of the motor. The position-controlled motor controller may receive, from the position sensor, a signal indicative of the position of the motor. Based on the received signal and a target position commanded to the motor, the feedback loop may attempt to bring the motor to the target position in a minimal amount of time. Achieving the target position in a minimal amount of time may involve the following operations.

First, during a first time interval, the position controlled motor controller may drive the motor with a first maximum acceleration in a first direction (e.g., a positive acceleration). The first direction may be a direction towards the target position commanded to the position-controlled motor controller. Second, during a second time interval, as the motor approaches the target position, the position-controlled motor controller may drive the motor with a second maximum acceleration in a second direction opposite to the first direction (e.g., a negative acceleration). Driving the motor in the second direction may cause the motor to slow down as the motor approaches the target position so as not to overshoot the target position. Thus, the motor may reach the target position at zero velocity (i.e., the motor may be stopped at the target position). This fixed and predictable behavior of the position-controlled motor controller may be used to determine a target position that, when commanded to the position-controlled motor controller, is predicted to cause the motor controller to drive the motor with a target velocity at a known/predetermined future time (i.e., a target time point). The known/predetermined future time may be based on a frequency with which a control system is configured to communicate with and/or provide position commands to the position-controlled motor controller.

In general, the position-controlled motor controller may be configured to drive the motor to the target position with a characteristic motion profile. In one embodiment, the characteristic motion profile may include a characteristic acceleration profile. The characteristic acceleration profile may include a first maximum acceleration in a first direction and a second maximum acceleration in a second direction opposite to the first direction. Thus, the position-controlled motor controller may attempt to bring the motor to the target position as quickly as possible using only the first and second maximum accelerations, as described above.

Alternatively, the characteristic acceleration profile may include the maximum accelerations in the first and second directions as well as acceleration profiles with which the position-controlled motor controller transitions from (i) zero acceleration to the first maximum acceleration, and vice versa, (ii) the first maximum acceleration to the second maximum acceleration, and vice versa, and (iii) the second acceleration to zero acceleration, and vice versa. For example, the characteristic acceleration profiles of the position-controlled motor controller may indicate acceleration transitions that result in a smooth and continuous velocity of the motor to minimize motor jerk.

The characteristic motion profile of the position-controller motor controller may be modifiable. In one example, a user interface may be provided that allows the parameters of the position-controller motor controller to be set. The parameters may include the characteristic acceleration profile, a maximum motor velocity limit, and a maximum motor torque limit, among other possibilities. Alternatively or additionally, the parameters may be modifiable by commands from a control system. For example, when the control system determines that the motor is expected to drive a larger load (e.g., when the vehicle is carrying a large payload), the control system may provide instructions to the position-controlled motor controller to reduce the maximum acceleration of the motor (e.g., for safety reasons) and increase the maximum motor torque (e.g., to ensure the motor can move the large load).

In one example, the operations herein described may be implemented by a control system. The control system may be configured to control a speed, direction, and position of a vehicle. The control system may receive or determine a commanded velocity profile for the vehicle to follow. The commanded velocity profile may be discrete or continuous. When the commanded velocity profile is continuous, it may be discretized into a plurality of velocity points corresponding to a plurality of time points. The time interval separating consecutive time points may be based on a frequency with which the control system is configured to communicate with the position-controlled motor controller (e.g., via Controller Area Network bus). The time interval separating consecutive time points may be referred to as a characteristic time interval.

The control system may select, as the target velocity for the motor, consecutive velocity points of the plurality of discrete velocity points corresponding to consecutive time points of the plurality of time points. Specifically, when a first target velocity is reached, the target velocity may be updated to the next target velocity corresponding to the next time point in the sequence of the plurality of time points. For example, the control system may first select as the target velocity a velocity corresponding to $t=1$ ($t=1$ may be the target time point corresponding to the target velocity). When time t=1 and the corresponding target velocity is reached, the target velocity may be updated to a velocity corresponding to t=2 (the target time point may be updated to t=2). When time t=2 and the corresponding target velocity is reached, the target velocity may be updated to a velocity corresponding to t=3, and so on. The process may be repeated for all time points of the plurality of time point corresponding to the commanded velocity profile.

The control system may determine, based on the characteristic acceleration profile of the position-controlled motor controller, a target position that, when commanded to the motor controller, is predicted to cause the motor controller to drive the motor with the determined target velocity. In other words, by knowing the acceleration profile with which the position-controlled motor controller is configured to attempt to reach positions commanded thereto, the control system may determine what position needs to be commanded to the motor controller so that the motor ends up rotating with the target velocity at the time point corresponding to the target velocity. When the target velocity is updated, the process may be repeated. Thus, the position-controlled motor controller may be caused to drive the motor to follow the sequence of target velocities.

The control system may determine, based on the characteristic acceleration profile, an expected velocity profile that the motor is predicted to follow during the characteristic time interval. The endpoint velocity of the expected velocity profile may be determined to be the target velocity. Thus, at a target time point corresponding to the endpoint of the expected velocity profile (e.g., the end of the characteristic time interval), the motor may be predicted to reach the target velocity.

The expected velocity profile may then be integrated over the characteristic time interval to determine an angular displacement of the motor. The determined angular displacement may be used to determine the target position. Specifically, the value of the determined angular displacement may be added to a current angular position of the motor and the sum may be provided to the position-controlled motor controller as input. Thus, if the position-controlled motor controller follows the characteristic acceleration profile as predicted, the position commanded to the position-controlled motor controller will result in the motor being driven at the target velocity at the target time point corresponding to the target velocity (e.g., at the end of the characteristic time interval). The target velocity may be updated and the operations repeated for consecutive velocity points along the commanded velocity profile.

In one embodiment, determining the target position that is predicted to cause the motor controller to drive the motor with the target velocity at the target time point may include determining the time point at which to reach the target velocity. For example, the target time point may be based on a frequency with which the control system is configured to communicate with the position-controlled motor controller. The target time point at which to reach the target velocity may be a time point at which the control system is configured to provide the next position command to the motor controller.

A first time interval may be determined during which the motor controller is predicted to drive the motor with the first maximum acceleration in the first direction. The motor controller may be predicted to drive the motor from a current position of the motor in the first direction towards the target position. A second time interval may be determined during which the motor controller is predicted to drive the motor with the second maximum acceleration in the second direction. The motor controller may be predicted to drive the motor in the second direction to reduce the speed of the motor as the motor approaches the commanded position. The determined time intervals and corresponding accelerations may make up the expected velocity profile of the motor.

A first double integral may be determined of the first maximum acceleration over the first time interval. A second double integral may be determined of the second maximum acceleration over the second time interval. The first and second time intervals may make up the characteristic time interval. The double integrals of acceleration may represent an angular displacement of the motor. The target position for the motor may be determined based on a sum of the first double integral and the second double integral. For example, the target position commanded to the motor controller may be the sum of the first double integral, the second double integral, and a current motor position.

II. Example Systems

FIG. 1 illustrates an example configuration of an electromechanical system 100 that may be used in connection with the embodiments described herein. The electromechanical system 100 may be configured to operate autonomously, semi-autonomously, and/or using directions provided by user(s). The electromechanical system 100 may be implemented in various forms, such as a robotic device (e.g., walking robot, a stationary robotic manipulator with an end effector), a ground vehicle, an aerial vehicle, a medical device, or a consumer device. For example, when the electromechanical system 100 is a vehicle, it may be implemented in various forms, such as forklifts, pallet jacks, cars, trucks, motorcycles, buses, boats, airplanes, helicopters, lawn mowers, earth movers, boats, snowmobiles, aircraft, recreational vehicles, amusement park vehicles, farm equipment, construction equipment, warehouse equipment, trams, golf carts, trains, and trolleys.

As shown in FIG. 1, the electromechanical system 100 may include processor(s) 102, data storage 104, and controller(s) 108, which together may be part of a control system 118. The electromechanical system 100 may also include sensor(s) 112, power source(s) 114, mechanical components 110, electrical components 116, and communication link(s) 120. Nonetheless, the electromechanical system 100 is shown for illustrative purposes, and may include more or fewer components. The various components of electromechanical system 100 may be connected in any manner, including wired or wireless connections. Further, in some examples, components of the electromechanical system 100 may be distributed among multiple physical entities rather than a single physical entity. Other example illustrations of electromechanical system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the electromechanical system 100, such as sensor(s) 112, power source(s) 114, mechanical components 110, electrical components 116, and/or communication link(s) 120.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some embodiments, the data storage 104 can be a single physical device. In other embodiments, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks) interface between any combination of the mechanical components 110, the sensor(s) 112, the power source(s) 114, the electrical components 116, the control system 118, the communication link(s) 120, and/or a user of the electromechanical system 100. In some embodiments, the controller 108 may be a purpose-built embedded device for performing specific operations with one or more subsystems of the electromechanical system 100.

The control system 118 may monitor and physically change the operating conditions of the electromechanical system 100. In doing so, the control system 118 may serve as a link between portions of the electromechanical system 100, such as between mechanical components 110 and/or electrical components 116. In some instances, the control system 118 may serve as an interface between the electromechanical system 100 and another computing device. Further, the control system 118 may serve as an interface between the electromechanical system 100 and a user. For instance, the control system 118 may include various components for communicating with the electromechanical system 100, including a joystick, buttons, and/or ports, etc. The example interfaces and communications noted above may be implemented via a wired or wireless connection, or both. The control system 118 may perform other operations for the electromechanical system 100 as well.

In some implementations, the control system 118 of electromechanical system 100 may also include communication link(s) 120 configured to send and/or receive information. The communication link(s) 120 may transmit data indicating the state of the various components of the electromechanical system 100. For example, information read by sensor(s) 112 may be transmitted via the communication link(s) 120 to a separate device. Other diagnostic information indicating the integrity or health of the power source(s) 114, mechanical components 110, electrical components 116, processor(s) 102, data storage 104, and/or controller 108 may be transmitted via the communication link(s) 120 to an external communication device.

In some implementations, the electromechanical system 100 may receive information at the communication link(s) 120 that is then processed by the processor(s) 102. The received information may indicate data that is accessible by the processor(s) 102 during execution of the program instructions 106. Further, the received information may change aspects of the controller(s) 108 that may affect the behavior of the mechanical components 114 or the electrical components 116. In some cases, the received information may indicate a query requesting a piece of information (e.g. the operational state of one or more of the components of the electromechanical system 100). The processor(s) 102 may subsequently transmit the piece of information back out the communication link(s) 120.

In some cases, the communication link(s) 120 may include a wired connection. The electromechanical system 100 may include one or more ports to interface the communication link(s) 120 to an external device. The communication link(s) 120 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, Bluetooth, or a near-field communication (NFC) device.

During operation, the control system 118 may communicate with other systems of the electromechanical system 100 via wired or wireless connections, and may further be configured to communicate with one or more users of the robot. As one possible illustration, the control system 118 may receive an input (e.g., from a user or from another robot) indicating an instruction to actuate the electromechanical system 100 to perform a series of tasks such as moving objects between different locations. The input to control system 118 may be received via the communication link(s) 120.

Based on this input, the control system 118 may perform operations to cause the electromechanical device 100 to use sensors 112 to scan an environment of the electromechanical system 100 (e.g., robotic system) and use mechanical components 110 to pick up and move an object identified by the scan.

Operations of the control system 118 may be carried out by the processor(s) 102. Alternatively, these operations may be carried out by the controller 108, or a combination of the processor(s) 102 and the controller 108. In some embodiments, the control system 118 may partially or wholly reside on a device other than the electromechanical system 100, and therefore may at least in part control the electromechanical system 100 remotely. Communication link(s) 120 may be used at least in part to carry out the remote communication.

Mechanical components 110 represent hardware of the electromechanical system 100 that may enable the electromechanical system 100 to perform physical operations. As a few examples, the mechanical components 110 may include physical members such as leg(s), arm(s), wheel(s), linkage(s), and/or end effector(s). The mechanical components 110 or other parts of electromechanical system 100 may further include motors, actuators, and/or transmissions/gearboxes/gear-trains arranged to move the physical members in relation to one another. The electromechanical system 100 may also include one or more structured bodies for housing the control system 118 and/or other components, and may further include other types of mechanical components. The mechanical components 110 used in a given electromechanical system may vary based on the design of the electromechanical, and may also be based on the operations and/or tasks the electromechanical may be configured to perform.

In some examples, the mechanical components 110 may include one or more removable components. The electromechanical system 100 may be configured to add and/or remove such removable components, which may involve assistance from a user and/or another robot. For example, the electromechanical system 100 may be configured with removable arms, hands, feet, legs, wheels, linkages, and/or end effectors so that these members can be replaced or changed as needed or desired. In some embodiments, the electromechanical system 100 may include one or more removable and/or replaceable battery units or sensors. Other types of removable components may be included within some embodiments.

The electromechanical system 100 may include sensor(s) 112 arranged to sense aspects of the electromechanical system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the electromechanical system 100 may be configured to receive sensor data from sensors that are physically separated from the electromechanical system (e.g., sensors that are positioned on other electromechanical systems/devices or located within the environment in which the electromechanical system is operating).

The sensor(s) 112 may provide sensor data to the processor(s) 102 (perhaps by way of data 107) to allow for interaction of the electromechanical system 100 with its environment, as well as monitoring of the operation of the electromechanical system 100. The sensor data may be used in evaluation of various factors for activation, movement, and deactivation of mechanical components 110 and electrical components 116 by control system 118. For example, the sensor(s) 112 may capture data corresponding to the terrain of the environment, location of nearby objects, and/or identity of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the electromechanical system 100 is operating. The sensor(s) 112 may monitor the environment in real time, and detect obstacles, elements of the terrain, weather conditions, temperature, and/or other aspects of the environment.

Further, the electromechanical system 100 may include sensor(s) 112 configured to receive information indicative of the state of the electromechanical system 100, including sensor(s) 112 that may monitor the state of the various components of the electromechanical system 100. The sensor(s) 112 may measure activity of systems of the electromechanical system 100 and receive information based on the operation of the various features of the electromechanical system 100, such the operation of extendable legs, arms, wheels, linkages, actuators, motors, and/or other mechanical and/or electrical features of the electromechanical system 100. The data provided by the sensor(s) 112 may enable the control system 118 to determine errors in operation as well as monitor overall operation of components of the electromechanical system 100.

As an example, the electromechanical system 100 may use force sensors to measure load on various components of the electromechanical system 100. In some implementations, the electromechanical system 100 may include one or more force sensors on one or more mechanical members such as a arms, legs, wheels, linkages, manipulators, and/or end effectors to measure the load on the actuators or motors that move the one or more members. As another example, the electromechanical system 100 may use one or more position sensors to sense the position of the actuators of the electromechanical system 100. For instance, such position sensors may sense states of extension, retraction, and/or rotation of the actuators/motors on arms or legs of the electromechanical system 100.

As another example, the sensor(s) 112 may include one or more velocity and/or acceleration sensors. The sensor(s) 112 may measure both linear and angular velocity and/or acceleration. For instance, the sensor(s) 112 may include an inertial measurement unit (IMU) having a 3-axis accelerometer, a 3-axis gyroscope, and a 3-axis magnetometer. The IMU may sense velocity and acceleration in the world frame, with respect to the gravity vector. The velocity and acceleration sensed by the IMU may then be translated to that of the electromechanical system 100 based on the location of the IMU in the electromechanical system 100 and the kinematics of the electromechanical system 100.

The electromechanical system 100 may include other types of sensors not explicated discussed herein. Additionally or alternatively, the electromechanical system may use sensors for purposes not enumerated herein.

The electromechanical system 100 may also include one or more power source(s) 114 configured to supply power to various components of the electromechanical system 100. Among other possible power systems, the electromechanical system 100 may include a hydraulic system, pneumatic system, electrical system, batteries, and/or other types of power systems. As an example illustration, the electromechanical system 100 may include one or more batteries configured to provide charge to components of the electromechanical system 100. Some of the mechanical components 110 and/or electrical components 116 may each connect to a different power source, may be powered by the same power source, or be powered by multiple power sources.

Any type of power source may be used to power the electromechanical system 100, such as electrical power or a gasoline engine. Additionally or alternatively, the electromechanical system 100 may include a hydraulic system configured to provide power to the mechanical components 110 using fluid power. Components of the electromechanical system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the electromechanical system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the electromechanical system 100. The electrical components 116 may interwork with the mechanical components 110 to enable the electromechanical system 100 to perform various operations. The electrical components 116 may be configured to provide power from the power source(s) 114 to the various mechanical components 110, for example. Further, the electromechanical system 100 may include electric motors. Other examples of electrical components 116 may exist as well.

Although not shown in FIG. 1, the electromechanical system 100 may include a body, which may connect to or house appendages and components of the electromechanical system. As such, the structure of the body may vary within examples and may further depend on operations that a given electromechanical system may have been designed to perform. For example, an electromechanical system developed to carry heavy loads may have a wide body that enables placement of the load. Similarly, an electromechanical system designed to reach high speeds may have a narrow, small body that does not have substantial weight. Further, the body and/or the other components may be developed using various types of materials, such as metals or plastics. Within other examples, an electromechanical system may have a body with a different structure or made of various types of materials.

The body and/or the other components may include or carry the sensor(s) 112. These sensors may be positioned in various locations on the electromechanical device 100, such as on the body and/or on one or more of the appendages, among other examples.

On its body, the electromechanical system 100 may carry a load, such as a type of cargo that is to be transported. The load may also represent external batteries or other types of power sources (e.g., solar panels) that the electromechanical system 100 may utilize. Carrying the load represents one example use for which the electromechanical system 100 may be configured, but the electromechanical system 100 may be configured to perform other operations as well.

As noted above, the electromechanical system 100 may include various types of legs, arms, wheels, tracks, treads, linkages, motors, actuators, and so on. In general, the electromechanical system 100 may be configured with zero or more legs. An implementation of the electromechanical system with zero legs may include wheels, tracks, treads, or wings, thrusters, rotors, or some other form of locomotion.

Although not shown in FIG. 1, when the electromechanical system 100 is a vehicle (e.g., vehicle system 100), it may include a chassis and/or an operator cabin, which may connect to or house components of the vehicle system 100. The structure of the chassis and/or cabin may vary within examples and may further depend on operations that a given vehicle may have been designed to perform. For example, a vehicle developed to carry large, heavy loads may have a wide, rigid chassis that enables placement of the load. Similarly, a vehicle designed to carry light loads at high speeds may have a narrow, small chassis that does not have substantial weight. Further, the chassis, cabin, and/or the other components may be developed using various types of materials, such as metals or plastics. Within other examples, a vehicle may have a chassis with a different structure or made of various types of materials.

The chassis, cabin, and/or the other components may include or carry the sensor(s) 112. These sensors may be positioned in various locations on the vehicle system 100, such as on top of the chassis to provide a high vantage point for the sensor(s) 112.

The vehicle system 100 may carry a load, such as a type of cargo that is to be transported. The load may also represent external batteries or other types of power sources (e.g., solar panels) that the vehicle system 100 may utilize. Carrying the load represents one example use for which the vehicle system 100 may be configured, but the vehicle system 100 may be configured to perform other operations as well.

III. Example Warehouse Vehicle Fleet

Figure 2A:
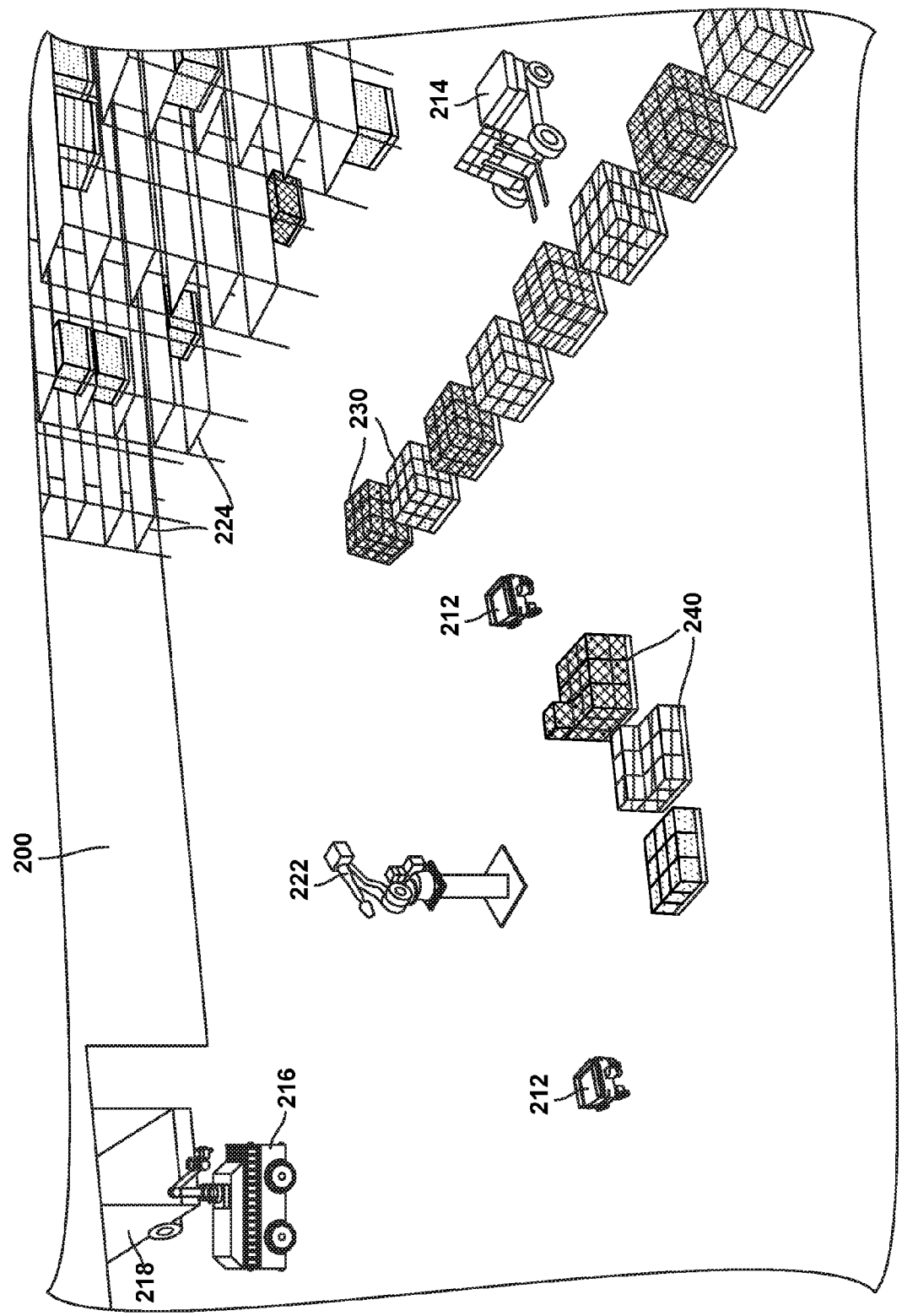
FIG. 2A illustrates a robotic fleet, according to an example embodiment.

FIG. 2A depicts a fleet of vehicles and robotic devices within a warehouse setting, according to an example embodiment. More specifically, different types of vehicles and robotic devices may form a heterogeneous robotic vehicle fleet 200 that may be controlled to collaborate to perform tasks related to the processing of items, objects, or boxes within a warehouse environment. Certain example types and numbers of different vehicles and robotic devices are shown here for illustration purposes, but robotic vehicle fleet 200 may employ more or fewer vehicles and robotic devices, may omit certain types shown here, and may also include other types of vehicles and robotic devices not explicitly shown. The systems and operations described herein may be implemented in, performed by, and/or applied to any of the vehicles shown or otherwise contemplated herein. Additionally, a warehouse environment is shown here with certain types of fixed components and structures, but other types, numbers, and placements of fixed components and structures may be used in other examples as well.

One example type of vehicle shown within robotic vehicle fleet 200 is an autonomous guided vehicle (AGV) 212, which may be a relatively small, vehicle with wheels that may function to transport individual packages, cases, or totes from one location to another within the warehouse. Another example type of vehicle is an autonomous fork truck 214, a mobile device with a forklift that may be used to transport pallets of boxes and/or to lift pallets of boxes (e.g., to place the pallets onto a rack for storage). An additional example type of a robotic vehicle/device is a robotic truck loader/unloader 216, a mobile device with a robotic manipulator as well as other components such as sensors to facilitate loading and/or unloading boxes onto and/or off of trucks or other vehicles. For instance, robotic truck unloader 216 may be used to load boxes onto delivery truck 218, which may be parked adjacent to the warehouse. In some examples, movements of delivery truck 218 (e.g., to deliver packages to another warehouse) may also be coordinated with robotic devices within the fleet.

Other types of vehicles and mobile robotic devices than those illustrated here may also be included as well or instead. For example, the vehicle fleet 200 may include variations of fork truck 214 such as a pallet jack and/or a fork truck/pallet jack hybrid. In some examples, one or more vehicles and/or robotic devices may use different modes of transportation besides wheels on the ground. For instance, one or more robotic vehicles/devices may be airborne (e.g., quadcopters), and may be used for tasks such as moving objects or collecting sensor data of the environment.

In further examples, the robotic fleet 200 may also include various fixed components that may be positioned within the warehouse. In some examples, one or more fixed robotic devices may be used to move or otherwise process boxes. For instance, a pedestal robot 222 may include a robotic arm elevated on a pedestal that is fixed to the ground floor within the warehouse. The pedestal robot 222 may be controlled to distribute boxes between other robots and vehicles and/or to stack and unstack pallets of boxes. For example, the pedestal robot 222 may pick up and move boxes from nearby pallets 240 and distribute the boxes to individual AGV's 212 for transportation to other locations within the warehouse.

In additional examples, robotic fleet 200 may employ additional fixed components positioned within a warehouse space. For instance, high density storage racks 224 may be used to store pallets and/or objects within the warehouse. The storage racks 224 may be designed and positioned to facilitate interaction with one or more vehicles and/or robotic devices within the fleet, such as autonomous fork truck 214. In further examples, certain ground space may be selected and used for storage of pallets or boxes as well or instead. For instance, pallets 230 may be positioned within the warehouse environment at chosen locations for certain periods of time to allow the pallets to be picked up, distributed, or otherwise processed by one or more of the vehicles and/or robotic devices.

Figure 2B:
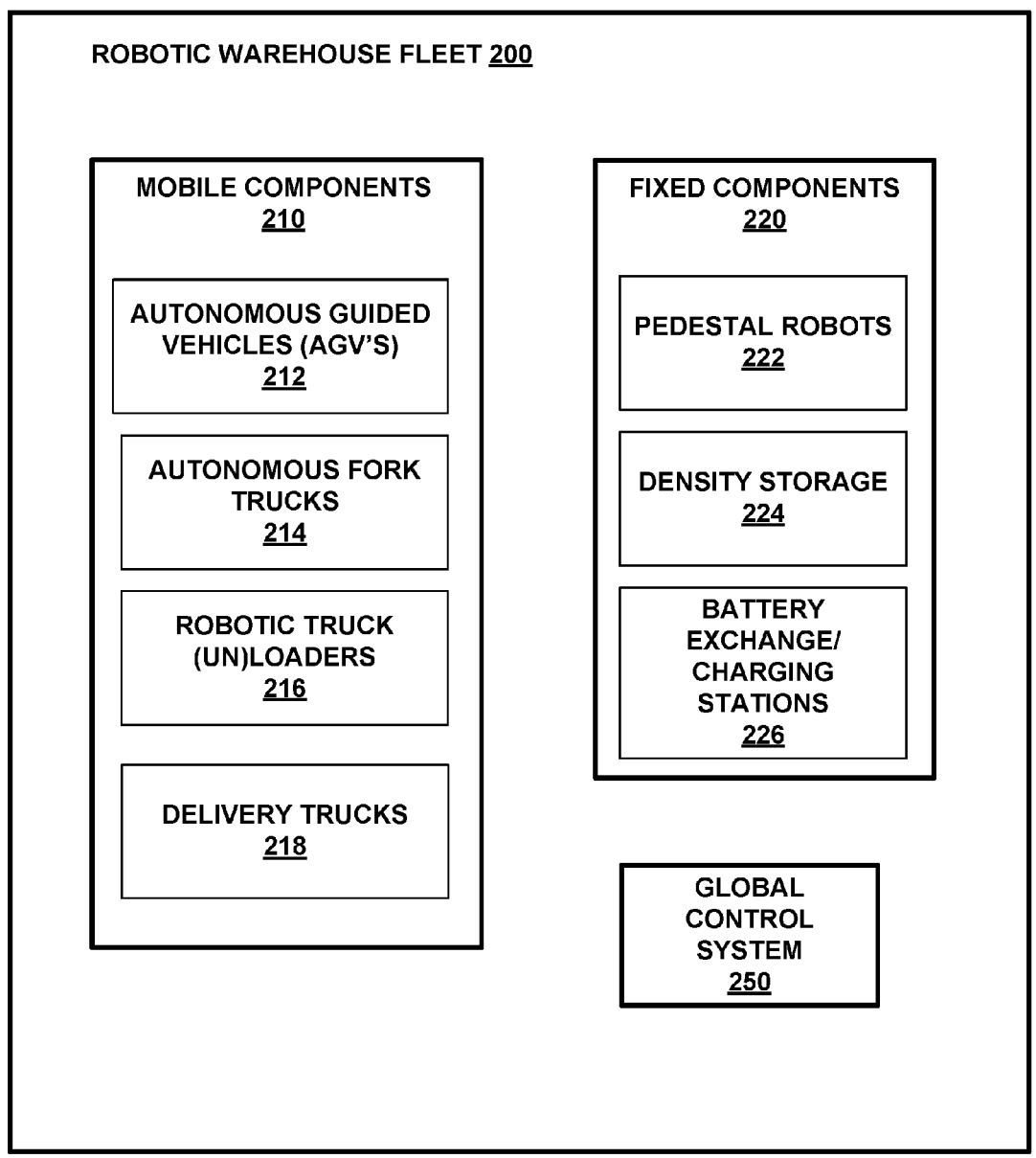
FIG. 2B illustrates a functional block diagram of components of a robotic fleet, according to an example embodiment.

FIG. 2B is a functional block diagram illustrating components of a robotic warehouse fleet 200, according to an example embodiment. The robotic fleet 200 could include one or more of various mobile components, such as AGV's 212, autonomous fork trucks 214, robotic truck loaders/unloaders 216, and delivery trucks 218. The robotic fleet 200 may additionally include one or more fixed components positioned within a warehouse or other environment, such as pedestal robots 222, density storage containers 224, and battery exchange/charging stations 226. In further examples, different numbers and types of the components illustrated within FIG. 2B may be included within a fleet, certain types may be omitted, and additional functional and/or physical components may be added to the examples illustrated by FIGS. 2A and 2B as well. To coordinate actions of separate components, a global control system 250, such as a remote, cloud-based server system, may communicate (e.g., through wireless communication) with some or all of the system components and/or with separate local control systems of individual components.

In some examples, global control system 250 may include a central planning system that assigns tasks to different robotic devices within fleet 200. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate aspects of the geometry and physics of box picking, packing, or storing.

Planning control may also be distributed across individual system components. For example, global control system 250 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally. In another example, the global planner may provide the vehicles and robotic devices with predetermined paths. The vehicles and robotic device may control a speed along the predetermined paths and may modify the predetermined paths based on local sensor data.

In additional examples, a central planning system may be used in conjunction with local vision on individual vehicles and/or robotic devices to coordinate functions of robots within robotic vehicle fleet 200. For instance, a central planning system may be used to get the vehicles and/or robots relatively close to where they need to go. However, it may be difficult for the central planning system to command vehicles and/or robots with millimeter precision, unless the vehicles/robots are bolted to rails or other measured components are used to precisely control vehicle/robot positions. Local vision and planning for individual vehicles and/or robotic devices may therefore be used to allow for elasticity between different vehicles and/or robotic devices. A general planner may be used to get a vehicle/robot close to a target location, at which point local vision of the vehicle/robot may take over. In some examples, most vehicle/robotic functions may be position-controlled to get the vehicles/robots relatively close to target locations, and then vision and handshakes may be used when needed for local control.

In further examples, visual handshakes may enable two vehicles/robots to identify one another by AR tag or other characteristics, and to perform collaborative operations within fleet 100. In additional examples, items (e.g., packages to be shipped) may be provided with visual tags as well or instead, which may be used by the vehicles and/or robotic devices to perform operations on the items using local vision control. In particular, the tags may be used to facilitate manipulation of the items by the vehicles and/or robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual vehicles/robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic vehicle fleets and/or traditional warehouses. For instance, global control system 250 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may dynamically update a map of the physical environment containing robotic fleet 200 and objects undergoing processing by the robotic devices. In some examples, the map may be continuously updated with information about dynamic objects (e.g., moving robots and packages moved by robots). In additional examples, a dynamic map could contain information on both the current configuration or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out). The map may be used to determine paths for the vehicles and robotic devices to follow in order to traverse the environment of the warehouse.

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by vehicles and robots. A potential benefit may be added transparency, both on the supplier side and the consumer side. On the supplier side, information about current locations of inventory may be used to avoid overstocking and/or to move items or pallets of items to different locations or warehouses to anticipate demand. On the consumer side, the information about current locations of items may be used to determine when a package will be delivered with improved accuracy.

In some examples, some or all of the mobile components 210 within robotic fleet 200 may periodically receive charged batteries from a battery exchange station 226 equipped with multiple battery chargers. In particular, the station 226 may replace a mobile robot's old batteries with recharged batteries, which may prevent robots from having to sit and wait for batteries to charge. The battery exchange station 226 may be equipped with a robotic manipulator such as a robotic arm. The robotic manipulator may remove batteries from an individual mobile robot and attach the batteries to available battery chargers. The robotic manipulator may then move charged batteries located at the station 226 into the mobile robot to replace the removed batteries. For instance, an AGV 212 with a weak battery may be controlled to move over to battery exchange station 226 where a robotic arm pulls a battery out from the AGV 212, puts the battery in a charger, and gives the AGV 212 a fresh battery.

Figure 3A:
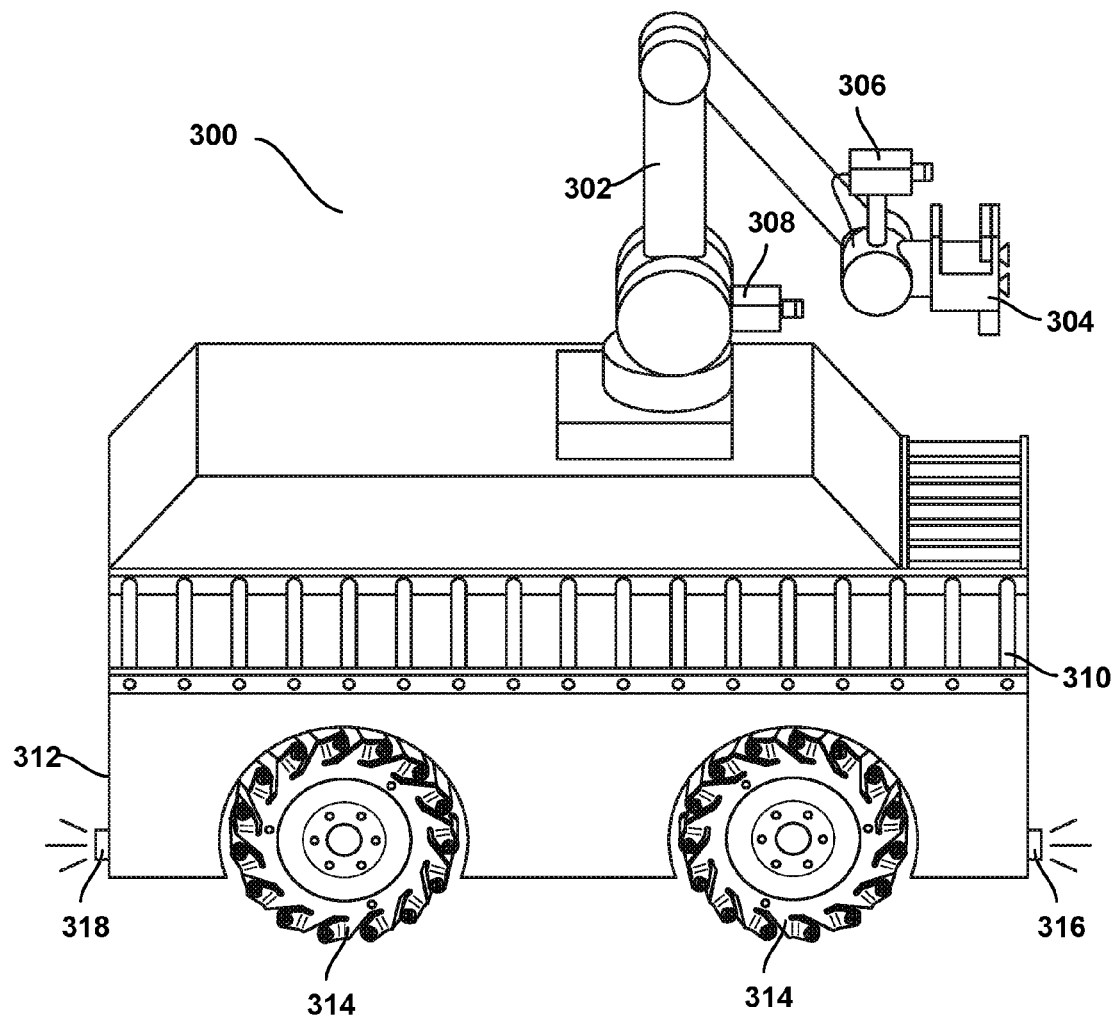
FIG. 3A illustrates a robotic truck unloader, according to an example embodiment.
Figure 3B:
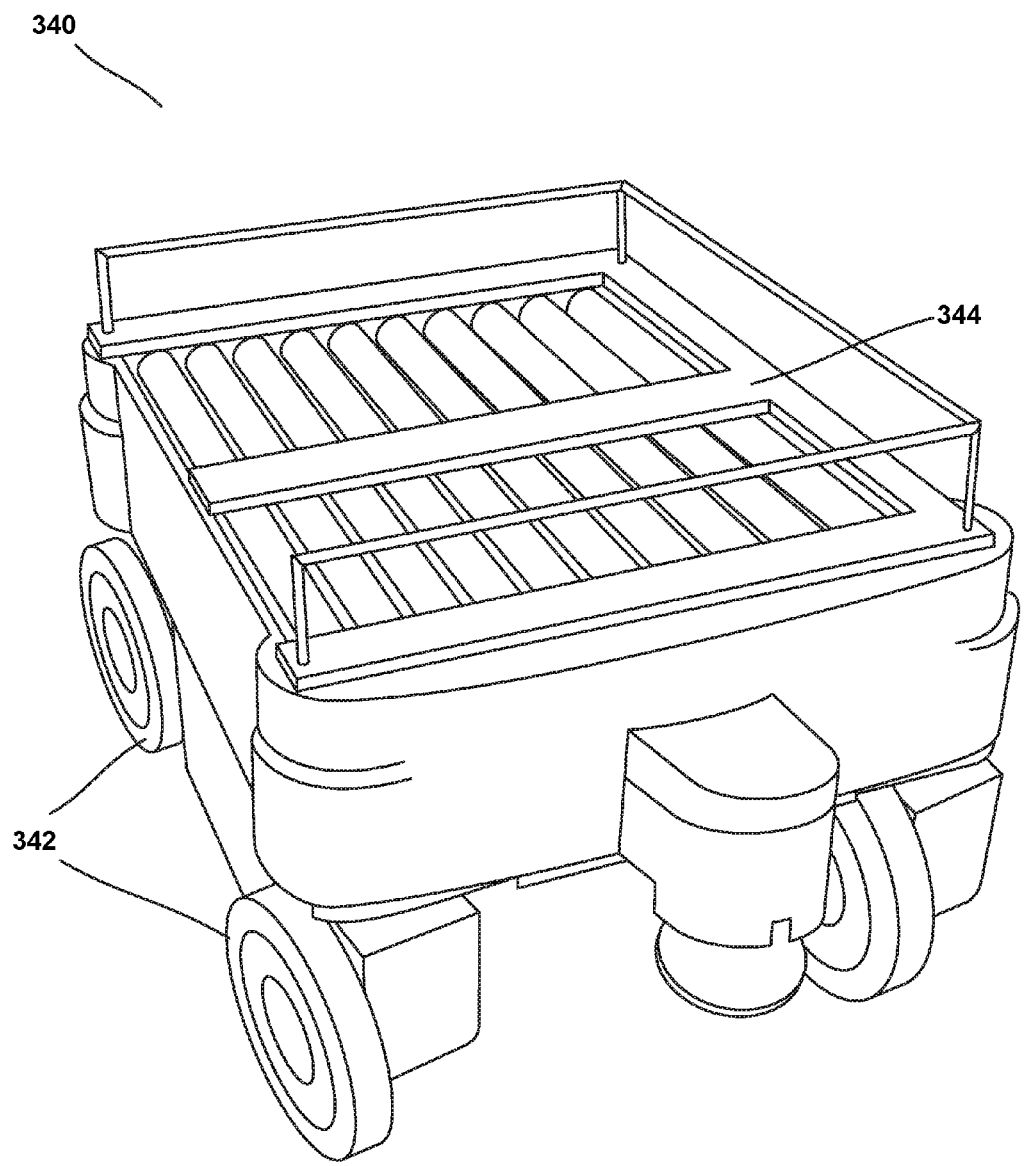
FIG. 3B illustrates an autonomous guided vehicle, according to an example embodiment.
Figure 3C:
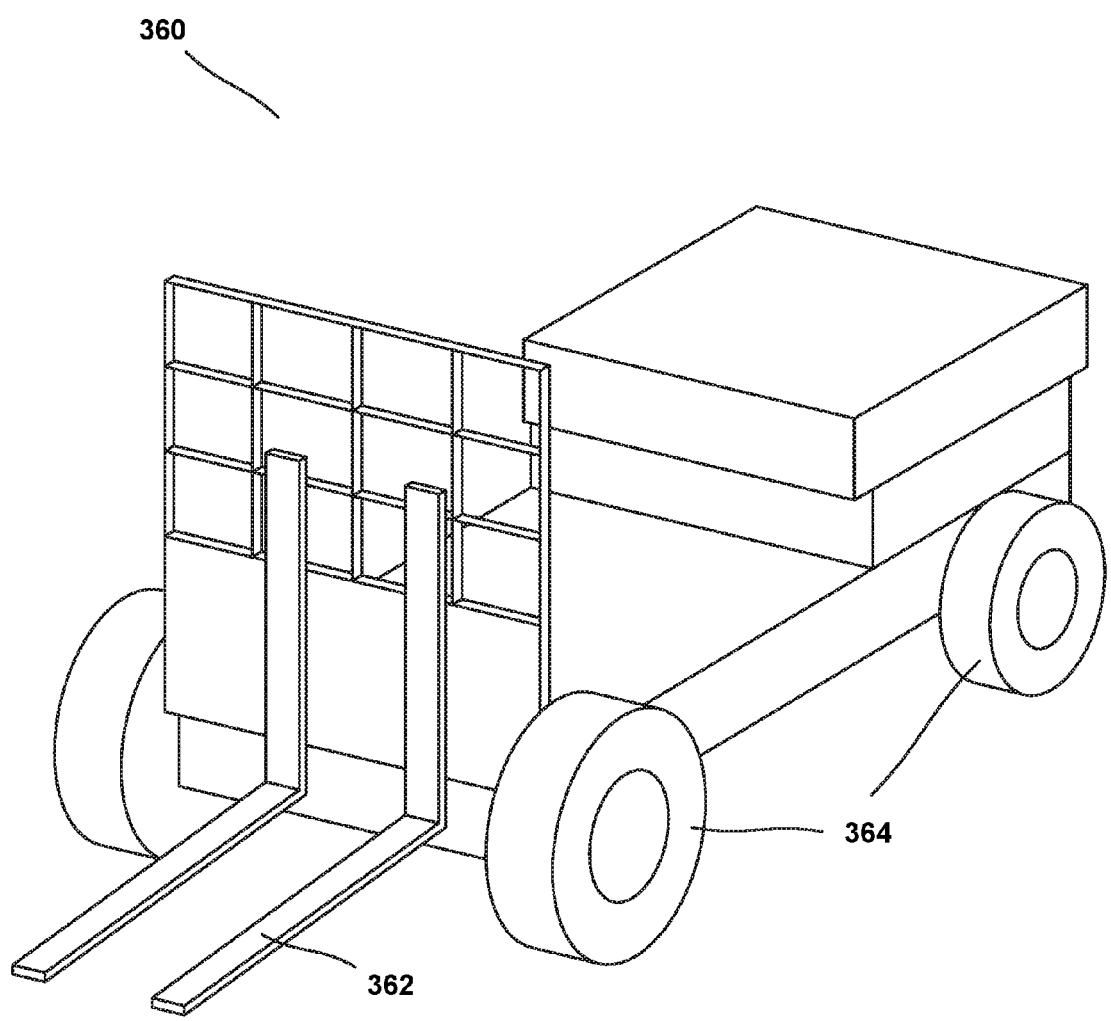
FIG. 3C illustrates an autonomous fork truck, according to an example embodiment.

FIGS. 3A-3C illustrate several examples of vehicles that may be included within a robotic vehicle warehouse fleet. Other robotic devices which vary in form from those illustrated here as well as other types of robotic devices may also be included.

FIG. 3A illustrates a robotic truck unloader 300, according to an example embodiment. Robotic truck unloader 300 may be an example of vehicle system 100, as illustrated in FIG. 1. In some examples, a robotic truck unloader may include one or more sensors, one or more computers, and one or more robotic arms. The sensors may move along a sensor trajectory to scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 300 may include a robotic arm 302 with a gripping component 304 for gripping objects within the environment. The robotic arm 302 may use the gripping component 304 to pick up and place boxes to load or unload trucks or other containers. The truck unloader 300 may also include a moveable cart 312 with wheels 314 for locomotion. The wheels 314 may be holonomic wheels that allow the cart 312 to move with two degrees of freedom. Additionally, a wrap around front conveyor belt 310 may be included on the holonomic cart 312. In some examples, the wrap around front conveyer belt may allow the truck loader 300 to unload or load boxes from or to a truck container or pallet without having to rotate gripper 304.

In further examples, a sensing system of robotic truck unloader 300 may use one or more sensors attached to a robotic arm 302, such as sensor 306 and sensor 308, which may be two-dimensional (2D) sensors and/or 3D depth sensors that sense information about the environment as the robotic arm 302 moves. In some examples, sensors 306 and/or 308 may be vision sensors (e.g., stereo cameras) having a limited field of view. Robotic arm 302 may be controlled to move sensor 306 to control a portion of the environment observable by the sensor 306.

The sensing system may determine information about the environment that can be used by a control system (e.g., a computer running motion planning software) to pick and move boxes efficiently. The control system could be located on the device or could be in remote communication with the device. In further examples, scans from one or more 2D or 3D sensors with fixed mounts on a mobile base, such as a front navigation sensor 316 and a rear navigation sensor 318, and one or more sensors mounted on a robotic arm, such as sensor 306 and sensor 308, may be integrated to build up a digital model of the environment, including the sides, floor, ceiling, and/or front wall of a truck or other container. Using this information, the control system may cause the mobile base to navigate into a position for unloading or loading.

In further examples, the robotic arm 302 may be equipped with a gripper 304, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

The truck unloader 300 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example embodiment, one or more banks of such batteries could be configured to provide electrical power. Other power supply materials and types are also possible.

FIG. 3B shows an autonomous guided vehicle (AGV), according to an example embodiment. More specifically, AGV 340 may be a relatively small, mobile robotic device that is capable of transporting individual boxes or cases. The AGV 340 may include wheels 342 to allow for locomotion within a warehouse environment. Additionally, a top surface 344 of the AGV 340 may be used to places boxes or other objects for transport. In some examples, the top surface 344 may include rotating conveyors to move objects to or from the AGV 340.

In additional examples, the AGV 340 may be powered by one or more batteries that can be quickly recharged at a battery charging station and/or exchanged for fresh batteries at a battery exchange station. In further examples, the AGV 340 may additionally include other components not specifically identified here, such as sensors for navigation. AGVs with different shapes and sizes also may be included within a robotic warehouse fleet, possibly depending on the types of packages handled by a warehouse.

FIG. 3C shows an autonomous fork truck, according to an example embodiment. More specifically, autonomous fork truck 360 may include a forklift 362 for lifting and/or moving pallets of boxes or other larger materials. In some examples, the forklift 362 may be elevated to reach different racks of a storage rack or other fixed storage structure within a warehouse. The autonomous fork truck 360 may additionally include wheels 364 for locomotion to transport pallets within the warehouse. In additional examples, the autonomous fork truck may include a motor and power supply as well as a sensing system, such as those described with respect to robotic truck unloader 300. The autonomous fork truck 360 may also vary in size or shape from the one illustrated in FIG. 3C.

Any of the robotic devices described herein may include one or more sensor(s) such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, audio sensors, microphones, speakers, radar, cameras (e.g., color cameras, grayscale cameras, and/or infrared cameras), depth sensors (e.g., Red Green Blue plus Depth (RGB-D), lasers, a light detection and ranging (LIDAR) device, a structured-light scanner, and/or a time-of-flight camera), a stereo camera, motion sensors (e.g., gyroscope, accelerometer, inertial measurement unit (IMU), and/or foot step or wheel odometry), and/or range sensors (e.g., ultrasonic and/or infrared), among others. The sensor(s) may provide sensor data to a processor(s) to allow for appropriate interaction of a robotic device with the environment. Additionally, a robotic device may also include one or more power source(s) configured to supply power to various components of the robotic device. Any type of power source may be used such as, for example, a gasoline engine or a battery.

IV. Example System Design

Example embodiments include systems and operations for causing a position-controlled motor controller to drive a motor to follow or approximate a commanded velocity profile. Specifically, a control system may determine target position commands to provide to the position-controlled motor controller. The target positions may cause the position-controlled motor controller to drive the motor controller with a target velocity at a predetermined future point in time (i.e., a target time point). By determining and providing sequences of such target positions to the position-controlled motor controller, the motor may be caused to follow or approximate the commanded velocity profile. The target positions may be determined based on a characteristic acceleration profile of the position-controlled motor controller. The characteristic acceleration profile may be known to the control system or may be predicted by the control system.

The control system may be used in any application where velocity control is desired or needed. For example, the position-controlled motor controller may be used to drive a motor configured to rotate one or more wheels of a vehicle (e.g., robotic truck unloader 300, AGV 340, and/or fork truck 360) according to a commanded velocity or velocity profile. In some embodiments, velocity control provided by the control system may be used in combination with the position control implemented by the position-controlled motor controller. For example, position control of the motor by the position-controlled motor controller may allow the vehicle to follow a desired path through an environment of the vehicle. Velocity control of the motor may allow the vehicle to traverse the desired path with a desired velocity profile. Combined velocity and position control may allow for more accurate synchronous control of multiple vehicles to prevent collisions between the vehicles.

In another example, the control system may coordinate operations of two or more position-controlled motor controllers. The first position-controlled motor controller may drive a first motor that controls a drive axis of the vehicle. The second position-controlled motor controller may drive a second motor that controls a steering axis of the vehicle. Coordinated velocity and position control of both motors may allow for smoother and more accurate tracking of the desired path through the environment by the vehicle.

Figure 4:
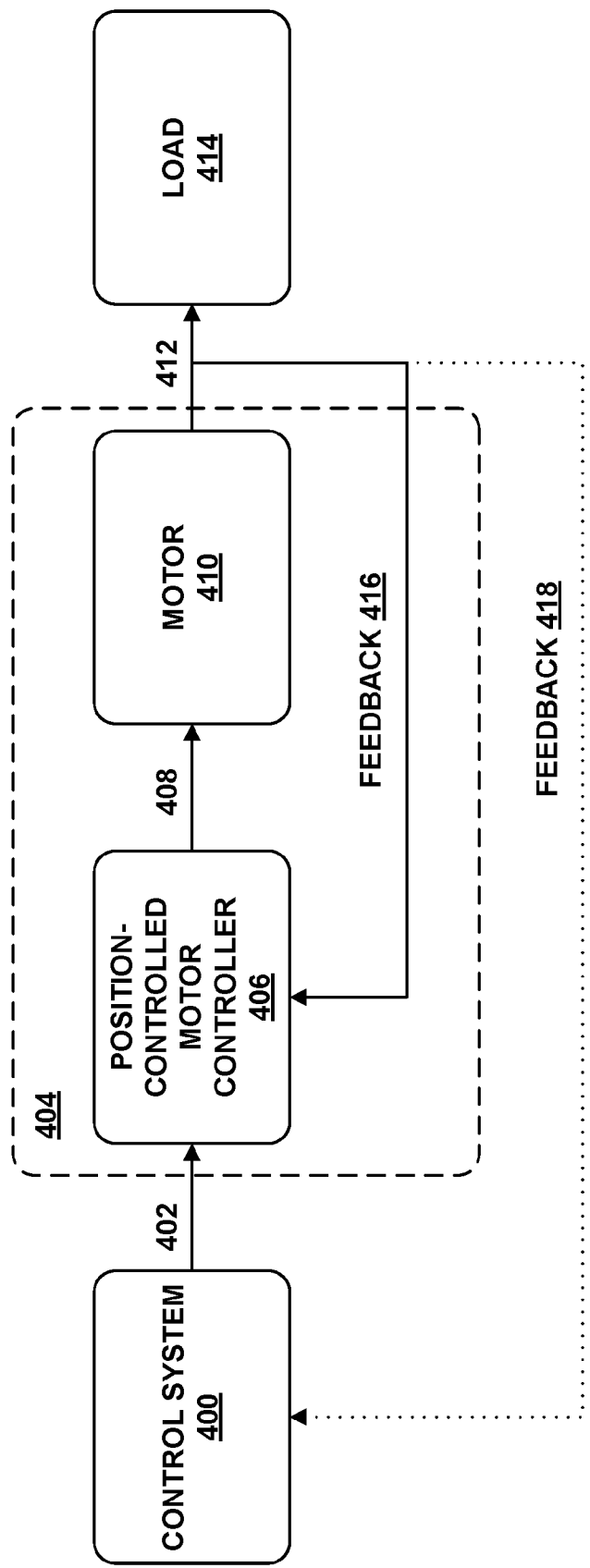
FIG. 4 illustrates an example system, according to an example embodiment.

FIG. 4 illustrates an example implementation of a system for operating a position-controlled motor controller to drive a motor with a target velocity. In particular, FIG. 4 illustrates control system 400 connected to motor system 404 through connection 402. Control system 400 may be implemented in software, hardware, or a combination thereof. Connection 402 may be a serial data bus connection implemented according to any one of a number of known serial bus standards such as Universal Data Bus (USB) or Controller Area Network bus (CAN). Alternatively, connection 402 may be a parallel data bus connection implemented according to any one of a number of known parallel bus standards such as Parallel Component Interconnect bus (PCI). In some embodiments, connection 402 may be a wireless connection. In some embodiments, the frequency with which control system 400 communicates with position-controlled motor controller 406 may be lower than a frequency at which the position feedback loop of the position-controlled motor controller operates.

Motor system 404 may include motor 410 driven by the position-controlled motor controller 406, as illustrated by connection 408. Connection 408 may depend on the type of motor 410. For example, when motor 410 is a simple DC motor, the connection 408 may include two power lines carrying a high and low voltage signal. In another example, when motor 410 is a brushless motor, connection 408 may include three power lines each carrying a signal having a specific phase and polarity relative to the other power lines.

Motor system 404 may represent, for example, an off-the-shelf motor system that implements position feedback control of motor 410. In some embodiments, motor system 404 might not implement velocity feedback control of motor 410 (e.g., motor system 404 might not include a velocity feedback loop). In other embodiments, motor system 404 may implement velocity feedback control of motor 410. However, motor system 404 might not be configured for operation of motor 410 according to user-specified target velocities. Thus, although motor system 404 may include a velocity feedback loop, there might not be a way to command the motor system 404 to drive motor 410 according to desired/target (e.g., commanded) velocities. Within examples, a motor system may include a motor and a position-controlled motor controller. Further, within examples, the motor system may be any motor system that implements at least position feedback control of the motor (e.g., a motor system configured to drive the motor to target positions provided to the motor system). In some examples, motor system 404 may be available as an integrated package that includes position-controlled motor controller 406 and motor 404. Alternatively, motor system 404 may be constructed from a motor and motor controller that are designed, manufactured, and/or sold as separate and distinct components or units.

Position-controlled motor controller 406 may implement a position feedback loop. Position-controlled motor controller 406 may monitor a position of the output of the motor 410 using one or more sensors such as position encoders or Hall Effect sensors, as illustrated by feedback connection 416. Position-controlled motor controller 406 may receive position commands from control system 400 and may, based on position feedback 416, drive motor 410 to bring the output 412 of motor 410 to the commanded position. The rotational position of motor output 412 may be measured directly at the motor (e.g., before any gearboxes) and/or directly at the load (e.g., after any gearboxes), as well as at points therebetween.

Within examples, a position-controlled motor controller may be any motor controller that implements position feedback control of a motor. Position-controlled motor controller 406 may additionally implement a velocity feedback control loop, among a number of other possible feedback loops. However, in some embodiments, position-controlled motor controller 406 might not be configured to operate motor 410 according to user-specified target velocities. For example, the velocity feedback loop might be controllable internally by the position-controlled motor controller 406 to ensure that motor 410 does not exceed a predetermined maximum velocity. The velocity control feedback loop might not be controllable externally by velocity commands provided by a user or a control system external to motor controller 406. Thus, although position-controlled motor controller 406 may include a velocity feedback loop, there might not be a way to command the motor controller 406 to drive motor 410 according to target velocities. Accordingly, control system 400 may be configured to provide to the position-controlled motor controller 406 target positions that cause motor controller 406 to spoof, mimic, or simulate velocity control of motor 410.

Motor 410 may be connected to a load 414 through connection 412. Connection 412 may be a shaft, a gear, a gearbox, a belt drive, and/or a combination thereof, among other possibilities. Load 414 may represent, for example, a wheel of a vehicle or an arm, leg, or other appendage of a robotic device as well as any number of other motor-driven devices or mechanisms.

In some embodiments, data from the one or more sensors configured to monitor the position of the motor output 412 may be fed back to control system 400 along feedback connection 418. Control system 400 may take a derivative of the position data to determine a velocity of the motor 412. Alternatively, feedback signal 418 may be received from one or more sensors (e.g., tachometers) configured to measure the velocity of motor 410 directly.

In contrast to conventional feedback systems, velocity feedback signal 418 might not be used by control system 400 to generate an error signal that is a difference between a commanded velocity and an observed velocity. Instead, control system 400 may rely on velocity feedback signal 418 to test and/or validate assumptions about the characteristic acceleration profile of the position-controlled motor controller 406. For example, when control system 400 detects a smaller than expected velocity or acceleration (e.g., derivative of signal 418 when signal 418 represents encoder data) based on feedback 418, control system 400 may assume or predict that motor 410 is driving a high load that prevents motor 410 from accelerating at the characteristic acceleration (e.g., motor 410 may be operating at maximum torque that may be insufficient to produce the characteristic acceleration). Accordingly, control system 400 may temporarily modify the assumed/predicted characteristic acceleration profile of position-controlled motor controller 406 until control system 400 again detects, based on signal 418, that motor 410 is driving load 414 according to the original characteristic acceleration profile.

V. Example Operations for Velocity Profile Approximation

Figure 5C:
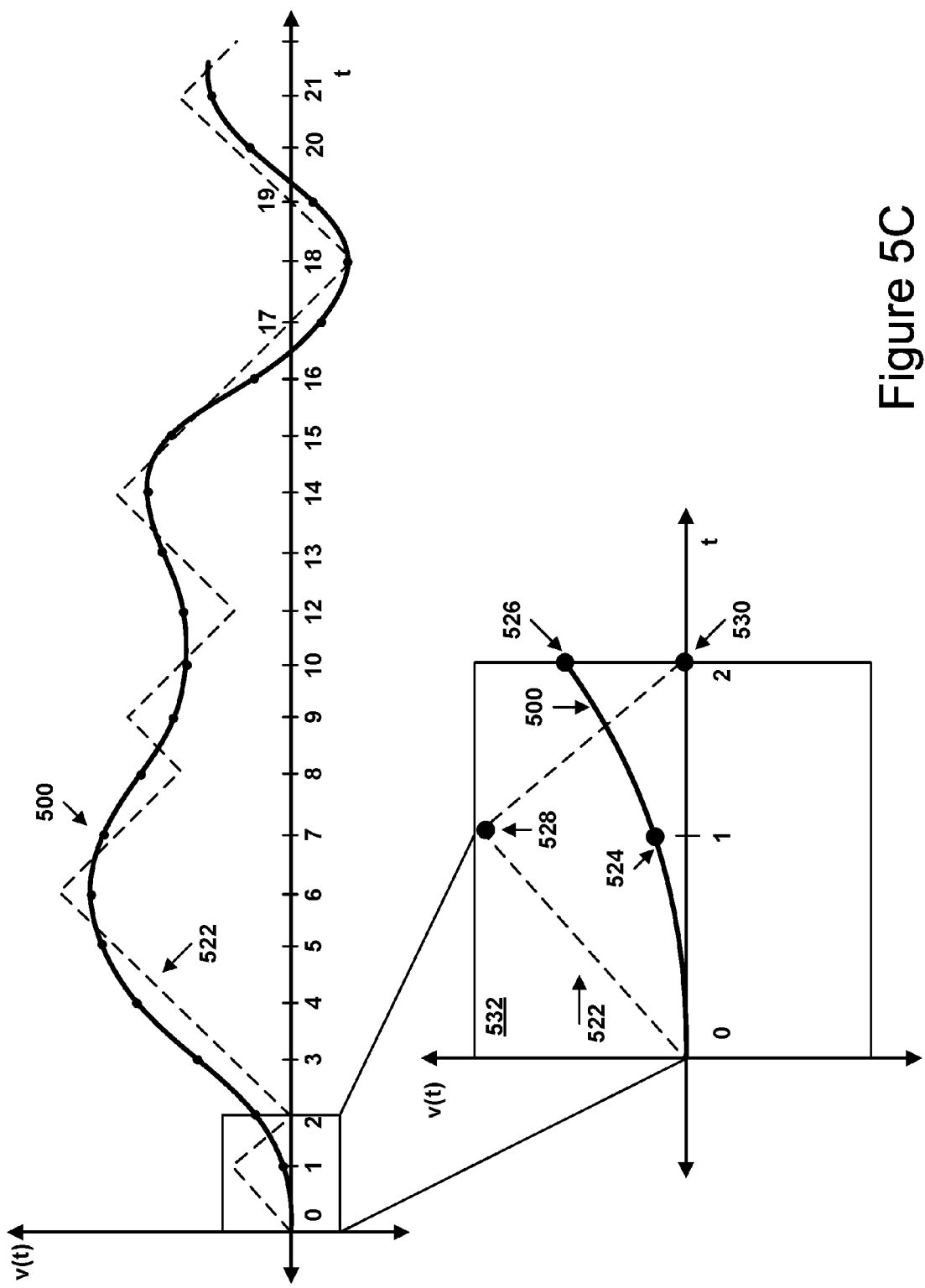
FIG. 5C illustrates a magnified portion of the commanded velocity profile, according to an example embodiment.

FIGS. 5A, 5B, and 5C illustrate example operations for using a position-controlled motor controller to approximate a velocity profile. Specifically, FIG. 5A illustrates a graph of velocity v(t) over a plurality of time points t ranging from t=0 to t=21. Curve/profile 500 represents a velocity profile that may be received or determined by a control system. Each of time points 0-21 may be associated with a corresponding velocity along curve 500. For example, time point t=1 is associated with corresponding velocity 524 and time point t=2 is associated with corresponding velocity 526. Velocity profile 500 may represent, for example, vehicle velocity through a portion of an environment.

A position-controlled motor controller may be commanded with target positions that cause the position-controlled motor controller to approximate the commanded velocity profile 500. Specifically, at each of time points 0-21, the control system may provide the position-controlled motor controlled with a position command. The position command at a particular time point may be a command intended to cause the motor to reach or approximate a target velocity corresponding to a subsequent time point. For example, at time point t=0, the position-controlled motor controller may be provided with a position command intended to cause the motor to reach or approximate target velocity 524 corresponding to time point t=1. Likewise, at time point t=1, the position-controlled motor controller may be provided with a position command intended to cause the motor to reach or approximate a target velocity corresponding to time point t=2.

The position-controlled motor controller may be configured to drive the motor with a characteristic acceleration profile that includes a first maximum acceleration in a first direction and a second maximum acceleration in a second direction. Thus, in the embodiment illustrated in FIGS. 5A, 5B, and 5C, at each of time points 0-21, the control system may select either the first maximum acceleration or the second maximum acceleration with which to drive the motor to approximate the target velocity. FIG. 5B illustrates velocity profile 522 resulting from these operations. The first maximum acceleration may be represented as upward-sloping line sections on the velocity vs. time graph of FIG. 5B. The second maximum acceleration may be represented as downward-sloping line sections on the velocity vs. time graph of FIG. 5B.

The control system may determine whether to drive the motor with the first maximum acceleration in the first direction or the second maximum acceleration in the second direction by determining, based on a current motor velocity, which acceleration brings the motor closer to the target velocity. For example, at time t=1, the control system may determine that the motor is currently rotating with velocity 528 (e.g., actual motor velocity 528 as opposed to target velocity 524). Driving the motor with the second maximum acceleration in the second direction will bring the motor velocity closer to target velocity 526 at time point t=2 than driving the motor with the first maximum acceleration in the first direction. Similarly, at time point t=2, driving the motor with the first maximum acceleration in the first direction will bring the motor velocity closer to the target velocity corresponding to time point t=3 than driving the motor with the second maximum acceleration in the second direction.

In order to cause the position-controlled motor controller to drive the motor with either the first or the second maximum acceleration during the entire characteristic time interval between consecutive time steps, the control system may command to the position-controlled motor controller a target position that the motor will not be able to reach in the characteristic time interval. For example, given the maximum acceleration and the current motor speed, if the motor is capable of completing five rotations in one characteristic time interval, the control system may command to the position-controlled motor controller a target position that is greater than five rotations from the current motor position. Before this target position is reached, the target position will be updated to the next target position. Thus, the control system can ensure that the position-controlled motor controller will drive the motor with the selected maximum acceleration during the entire characteristic time interval. In other words, during the characteristic time interval, the motor will not get a chance to get sufficiently close to the commanded position to slow down as it approaches the target position.

The actual velocity profile 522 produced by the motor approximates the commanded velocity profile 500. However, the individual velocities along actual velocity profile 522 may deviate from the target velocities of the commanded velocity profile 500. For example, FIG. 5C illustrates a magnified portion 532 of the actual velocity profile 522 and the commanded velocity profile 500. Specifically, at time point t=1, the actual velocity 528 of the motor is more than three times as high as the desired target velocity 524. Likewise, at time point t=2, the actual velocity 530 of the motor is zero while the desired target velocity 526 is greater than zero.

VI. Example Operations for Velocity Profile Tracking

Figure 6:
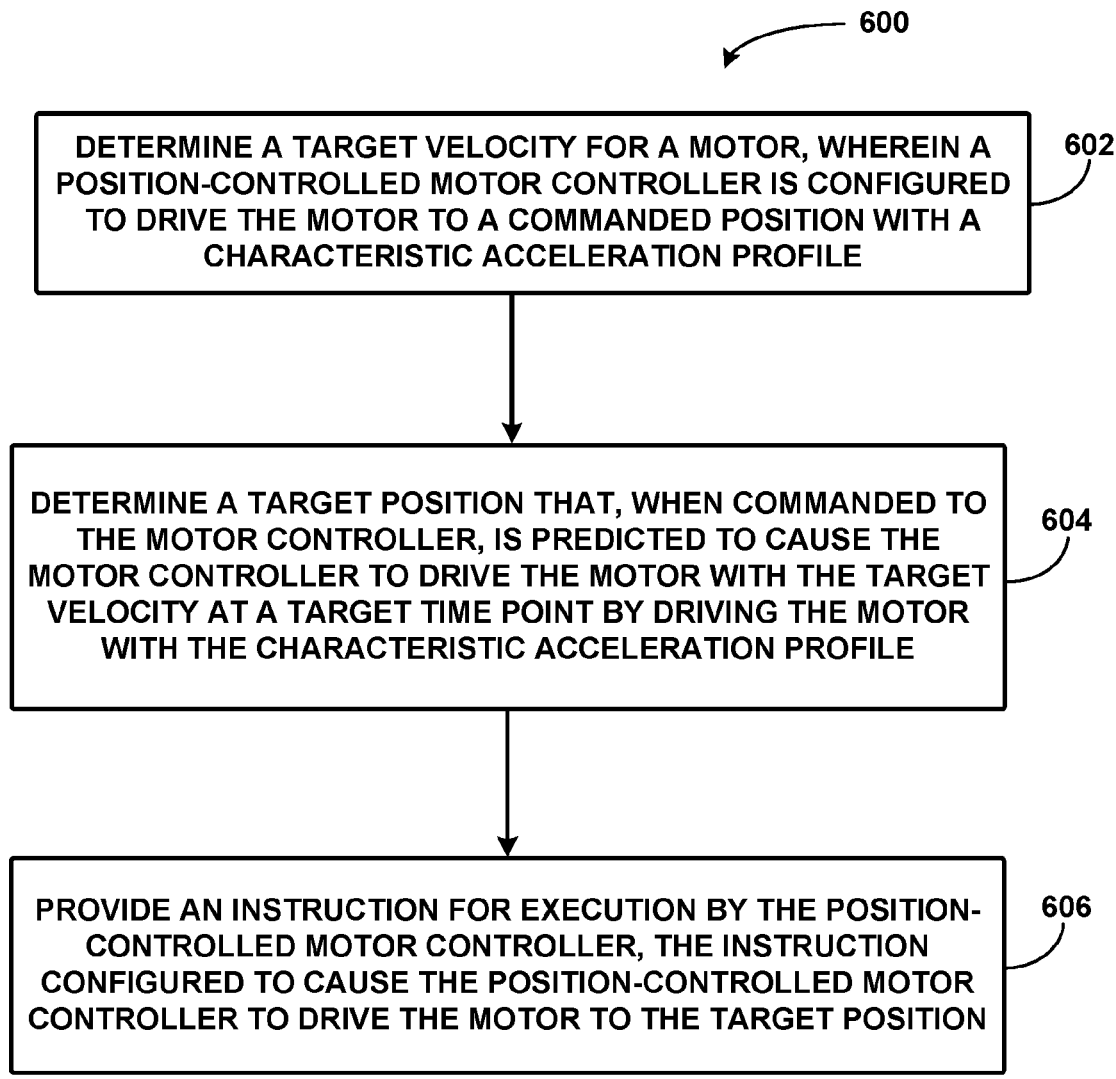
FIG. 6 illustrates an example flow diagram, according to an example embodiment.

FIG. 6 illustrates example operations that may be performed to cause a position-controlled motor controller to follow/track or approximate a commanded velocity profile. Specifically, in block 602 of flow diagram 600, a target velocity for a motor may be determined. A position-controlled motor controller may be configured to drive the motor to a commanded position with a characteristic acceleration profile. The target velocity for the motor may be a target velocity corresponding to a time point along a commanded velocity profile. The position-controlled motor controller may be connected to the motor as illustrated in FIG. 4.

In block 604, a target position may be determined that, when commanded to the motor controller, may be predicted to cause and/or will cause the motor controller to drive the motor with the target velocity at a target time point. The position-controlled motor controller may drive the motor with the target velocity at the target time point by driving the motor with or according to the characteristic acceleration profile of the position-controlled motor controller.

In block 606, an instruction may be provided for execution by the position-controlled motor controller. The instruction may be configured to cause the position-controlled motor controller to drive the motor to the target position. Driving the motor to the target position may, at the target time point, result in the motor being driven at the target velocity or at least at a velocity approximately equal to the target velocity. The operations of flow diagram 600 may be repeated at each time point of a plurality of time points corresponding to a commanded velocity profile (e.g., time points 0-21 along commanded velocity profile 500).

A "velocity approximately equal to the target velocity" may encompass variations within +/−1% of the target velocity when the motor driven by the position-controlled motor controller is not under load and/or is not experiencing any external disturbances. When the motor is under load and/or experiences external disturbances (e.g., a wheel driven by the motor drives over a bump or hole), the "velocity approximately equal to the target velocity" may encompass variations within +/−10% of the target velocity.

Figure 7A:
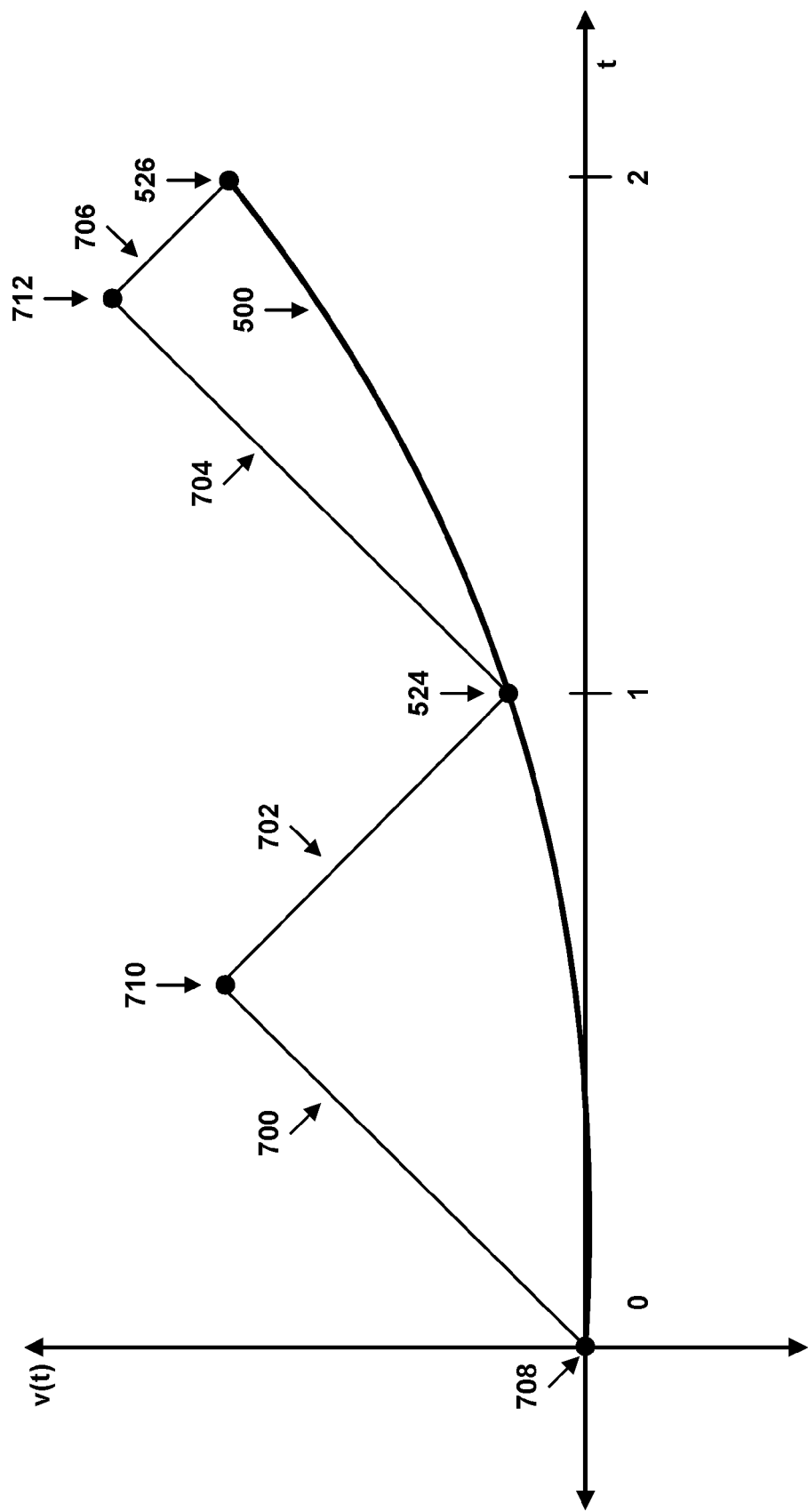
FIG. 7A illustrates a predicted motor velocity profile of a motor driven by a position-controlled motor controller, according to an example embodiment.

FIGS. 7A-7D illustrate in more detail the operations of FIG. 6. Specifically, FIG. 7A illustrates the portion of the commanded velocity profile 500 contained in the magnified portion 524 shown in FIG. 5C. At starting time point t=0, the commanded velocity 708 and the actual starting velocity 708 of the motor may both be zero (e.g., the motor may start from rest). At time point t=1, velocity profile 500 may indicate a target velocity 524. A target position may be determined that, when commanded to the position-controlled motor controller, is predicted to drive the motor with the target velocity 524 at time point t=1. Time point t=1 may be referred to as a target time point or a predetermined future time point at which to reach the target velocity.

Specifically, the control system may determine the target position that is predicted to cause the motor controller to drive the motor with the target velocity 524 at time point t=1 by determining an intersection point 710 between a first line 700 and a second line 702. The first line 700 may be defined as a line through a point corresponding to the starting velocity 708 and the starting time point t=0 and having a slope corresponding to the first maximum acceleration. The second line 702 may be defined as a line through a point corresponding to the target velocity 524 and the target time point t=1 and having a slope corresponding to the second maximum acceleration.

The control system may assume or reliably predict that the position-controlled motor controller will first drive the motor according to the velocity represented by line 700 and then according to the velocity represented by line 702 based on the characteristic acceleration profile that the position-controlled motor controller is configured to follow. The position-controlled motor controller may be configured to drive the motor to target positions commanded thereto in a minimal amount of time. In order to minimize the time required to reach target positions, the position-controlled motor controller may be configured to first drive the motor with the first maximum acceleration in the first direction. As the motor approaches the target position, the motor may be caused to slow down so as not to overshoot the target position by being driven with the second maximum acceleration in the second direction.

Figure 7B:
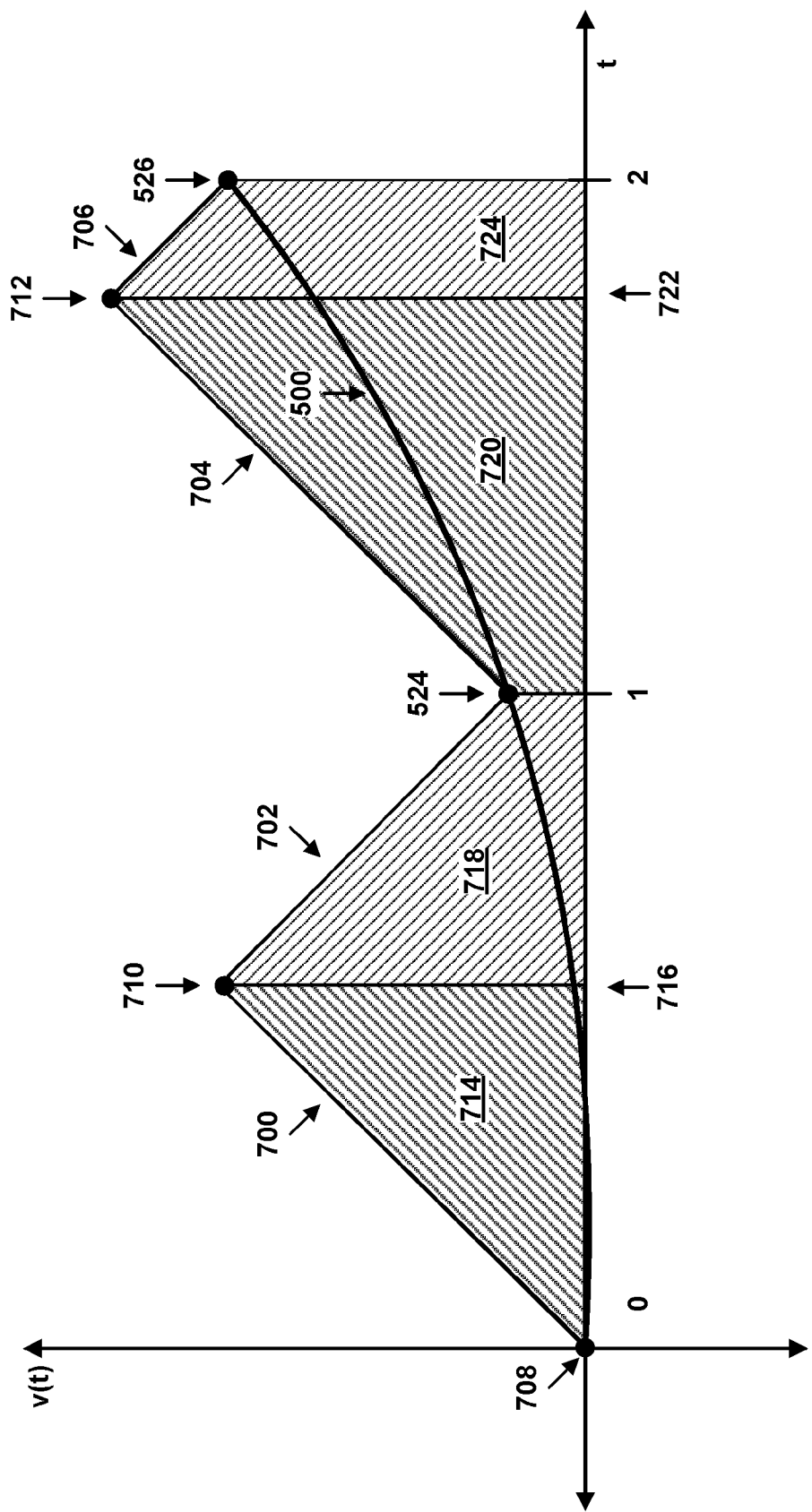
FIG. 7B illustrates integrals of a predicted motor velocity profile, according to an example embodiment.

The control system may then determine an integral 714 of the first line 700 between the starting time point t=0 and time point 716 corresponding to the intersection point 710, as shown in FIG. 7B. Specifically, the shaded area 714 may represent the integral of line 700 between time point t=0 and time point 716. Integral 714 may represent an angular displacement of the motor due to velocity 700. Additionally, control system may determine an integral 718 of the second line 702 between the time point 716 corresponding to the intersection point 710 and the target time point t=1.

The target position may then be determined by the control system based on the sum of the determined integral 714 of the first line 700 and the determined integral 718 of the second line 702. Specifically the target position may be determined by adding integral 714 and integral 718 to a current position of the motor. This target position may then be commanded to the position-controlled motor controller. As the position-controlled motor controller drives the motor to the commanded target position, the motor will follow a velocity profile represented by lines 700 and 702. Thus, at time point t=1, the motor will be driven at target velocity 524. The process may be repeated and a new target position may be determined to cause the position controlled-motor controller to drive the motor at the next target velocity 526. Specifically, at time point t=1 this new target position may be commanded to the position-controlled motor controller before the motor is driven past (e.g., overshoots) the target velocity 524.

In order to drive the motor with the target velocity 526 at time point t=2, the control system may repeat the operations for the time interval between t=1 and t=2. Specifically, the control system may determine a target position that is predicted to cause the motor controller to drive the motor with the target velocity 526 at time point t=2 by determining an intersection point 712 between a first line 704 and a second line 706. The first line 704 may be defined as a line through a point corresponding to the starting velocity 524 and the starting time point t=1 and having a slope corresponding to the first maximum acceleration. The second line 706 may be defined as a line through a point corresponding to the target velocity 526 and the target time point t=2 and having a slope corresponding to the second maximum acceleration.

The control system may then determine an integral 720 of the first line 704 between the starting time point t=1 and time point 722 corresponding to the intersection point 712, as shown in FIG. 7B. Specifically, the shaded area 720 may represent the integral of line 704 between time point t=1 and time point 722. Additionally, control system may determine an integral 724 of the second line 706 between the time point 722 corresponding to the intersection point 712 and the target time point t=2.

The target position may then be determined by the control system based on the sum of the determined integral 720 of the first line 704 and the determined integral 724 of the second line 706. Specifically the target position may be determined by adding integral 720 and integral 724 to a current position of the motor. This target position may then be commanded to the position-controlled motor controller.

The process may be repeated for all points along commanded velocity profile 500. This may result in the motor tracking the commanded velocity profile 500 as illustrated in FIG. 7C by the actual motor velocity profile 726. The time interval between consecutive time steps t=0 to t=21 may be reduced or minimized such that instantaneous deviations of the actual motor velocity 726 from the commanded velocity 500 may be small or negligible (e.g., the deviations might not affect the performance of the vehicle driven by the motor).

When the motor is not operating under load and/or is not experiencing disturbances, the average acceleration within a characteristic time interval may be within +/−1% of the desired acceleration dictated by the commanded velocity profile 500 over the characteristic time interval. In other words, the motor may, at each of the consecutive time steps t=0 to t=21, reach an actual velocity within +/−1% of the target velocity dictated by commanded velocity profile 500. When the motor is operating under load and/or is experiencing disturbances, the average acceleration within a characteristic time interval may be within +/−10% of the desired acceleration dictated by the commanded velocity profile 500 over the characteristic time interval. The difference between the actual and desired acceleration may vary in proportion to the load or disturbance applied to the motor (e.g., motor response may be slower due to greater load inertia). This difference may be caused by the inherent properties of the feedback loops within the position-controlled motor controller (e.g., the feedback loop might not be able to perfectly predict and adapt to varying motor loads).

FIG. 7D illustrates a comparison between the actual velocity profile 522 produced by the embodiment of FIGS. 5A-5C and the actual velocity profile 726 produced by the embodiment of FIGS. 7A-7D. Notably, it can be seen from FIG. 7D that actual motor velocity profile 726 tracks the commanded velocity profile 500 more accurately than actual motor velocity profile 522. Specifically, in contrast to actual motor velocity profile 522, actual motor velocity profile 726 actually achieves the target velocity at most time points 0-21 along commanded velocity profile 500. The accuracy of tracking the commanded velocity profile 500 may be quantified by, for example, computing the root mean square error between the commanded velocity profile 500 and each of the actual motor velocity profile 522 and 726.

In some examples, when an acceleration along a portion of the commanded velocity profile 500 is greater than the first maximum acceleration or the second maximum acceleration, the position-controlled motor controller might not be able to reach the target velocity. For example, the acceleration between time point t=15 and t=16 may be greater than the second maximum acceleration in the second direction. Thus, although the motor may be driven with the second maximum acceleration during the entire time interval between time points t=15 and t=16, the target velocity at time t=16 might not be reached.

In some instances, the characteristic acceleration profile of the position-controlled motor controller may be modifiable by, for example, instructions from the control system. Accordingly, when the control systems detects portions along commanded velocity profile 500 that require acceleration that exceeds the first maximum acceleration or the second maximum acceleration, the control system may determine a second characteristic acceleration profile for the position-controlled motor controller. The second characteristic acceleration profile may permit higher accelerations sufficient to meet any accelerations indicated by the commanded velocity profile. The control system may then provide instructions to the position-controlled motor controller to configure the position-controlled motor controller to drive the motor to commanded positions with the second characteristic acceleration profile. Once any high-acceleration portions of the commanded velocity profile 500 have been traversed, the control system may command the position-controlled motor controller to return to operating with the original characteristic acceleration profile.

Further, when the commanded velocity profile 500 indicates to operate the motor in reverse, with a negative velocity, the operations described above for determining the target position may be modified to account for the negative velocity. The result of backwards operation of the motor is illustrated along time points t=17, t=18, and t=19 in FIGS. 7C and 7D. For example, the first maximum acceleration in the first direction may be a maximum positive acceleration.

The second maximum acceleration in the second direction may be a maximum negative acceleration.

When the target velocity is positive, the control system may determine an intersection point between (i) a first line through a point corresponding to the starting velocity and the starting time point, the first line having a slope corresponding to the positive acceleration and (ii) a second line through a point corresponding to the target velocity and the target time point, the second line having a slope corresponding to the negative acceleration. Integrals of the lines may then be taken, as described with respect to FIGS. 7A and 7B, to determine the target position that is predicted to produce the target velocity.

In contrast, when the target velocity is negative, the control system may determine an intersection point between (i) a first line through a point corresponding to the starting velocity and the starting time point, the first line having a slope corresponding to the negative acceleration and (ii) a second line through a point corresponding to the target velocity and the target time point, the second line having a slope corresponding to the positive acceleration. Integrals of the lines may then be taken, as described with respect to FIGS. 7A and 7B, to determine the target position that is predicted to produce the target velocity.

More generally, these operations may be described as follows. A time point may be determined at which to reach the target velocity. A first time interval may be determined during which the motor controller is predicted to drive the motor with the first maximum acceleration in the first direction. A second time interval may be determined during which the motor controller is predicted to drive the motor with the second maximum acceleration in the second direction. Driving the motor with the first acceleration in the first direction during the first time interval and driving the motor with the second acceleration in the second direction during the second time interval may be predicted to cause the motor to reach the target velocity at the determined time point.

The target position that is predicted to cause the motor controller to drive the motor with the target velocity may be determined by determining a first double integral of the first maximum acceleration over the first time interval. A second double integral may be determined of the second maximum acceleration over the second time interval. Finally, the target position may be determined based on the sum of the first double integral and the second double integral.

Determining the target position may further involve determining the length of the first interval and the second interval. Specifically, the length of the intervals may be based on a determined intersection point between a first line and a second line. The second line may be a line through a point corresponding to the target velocity and the target time point. The second line may have a slope corresponding to an acceleration that brings the velocity to zero. The acceleration may be one of the first maximum acceleration in the first direction or the second maximum acceleration in the second direction.

For example, as illustrated in FIG. 7A, line 700 may represent a positive acceleration vector (e.g., line 700 points north-east) and line 702 may represent a negative acceleration vector (e.g., line 702 points south-east). When line 702 is drawn through point 524, line 702 represents a negative acceleration that works to bring the motor velocity to zero (e.g., line 702 points toward the horizontal axis). In contrast, if line 700 were to be horizontally shifted and drawn through point 524, line 700 would represent a positive acceleration that would work to further increase the motor velocity (e.g., line 700 points away from the horizontal axis). Thus, in the instance illustrated in FIG. 7A, the second line through point 524 corresponding to the target velocity and the target time point t=1 and having a slope corresponding to a negative acceleration that brings the velocity to zero is line 702.

The first lines may be a line through a point corresponding to the starting velocity and the starting time point and having a slope corresponding to an acceleration with a direction opposite to that of the acceleration selected for the second line. Thus, in the instance illustrated in FIG. 7A, the first line through point 708 corresponding to the starting velocity and the starting time point t=0 and having a slope corresponding to an acceleration (e.g., positive acceleration) with a direction opposite to that of the acceleration selected for the second line is line 700. Integrals of the lines may then be taken, as described with respect to FIGS. 7A and 7B, to determine the target position that is predicted to produce the target velocity.

VII. Example Operations for Velocity Profile Tracking with Velocity Limit

Figure 8A:
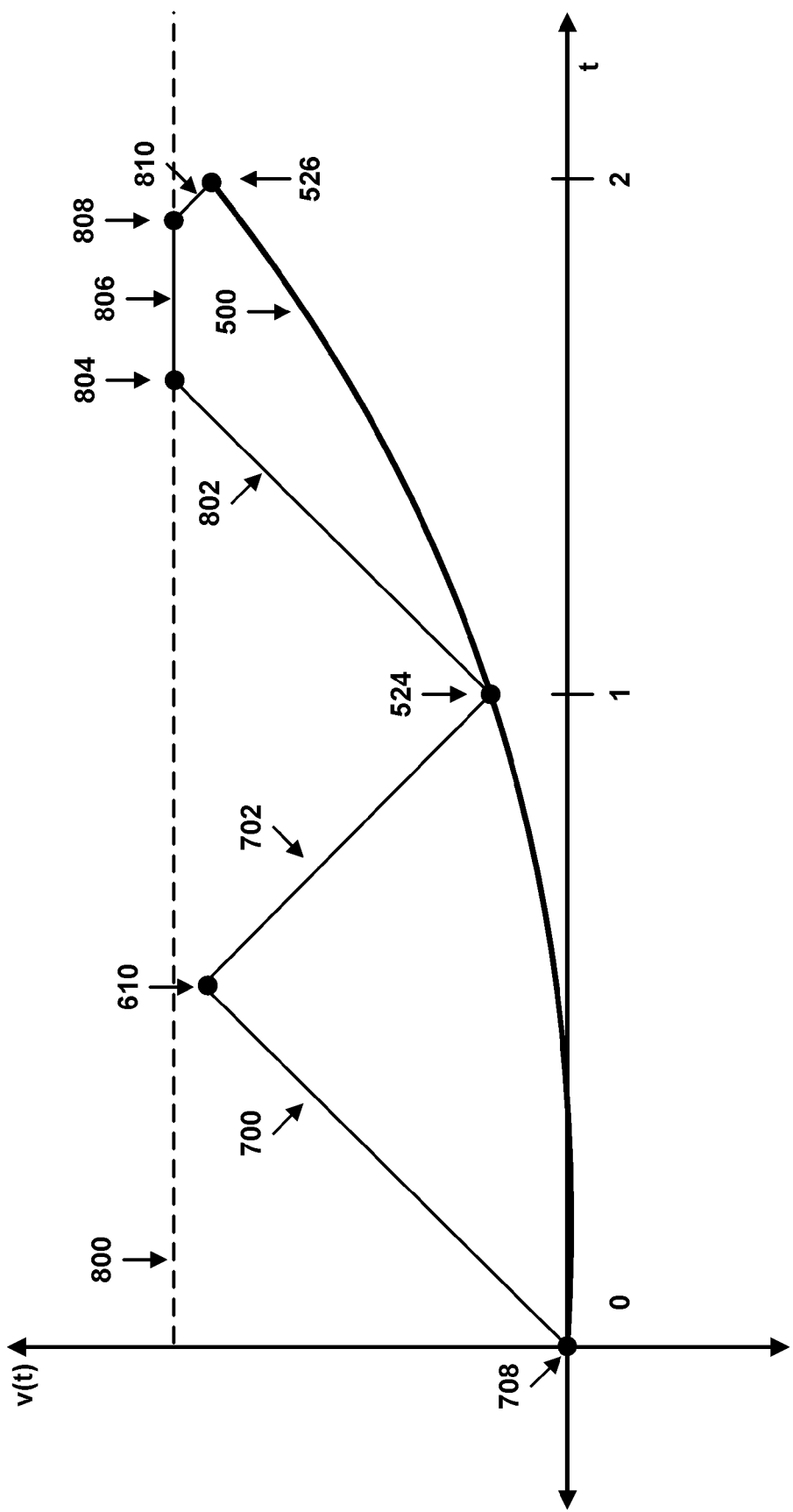
FIG. 8A illustrates a predicted motor velocity profile including a maximum motor velocity, according to an example embodiment.

FIG. 8A illustrates an example embodiment that considers, when determining the target position, a maximum velocity that the position-controlled motor controller is configured to drive the motor with. The characteristic motion profile with which the position-controlled motor controller is configured to drive the motor may include the maximum velocity. Specifically, position-controlled motor controller may be configured to drive the motor with a maximum velocity 800. The position-controlled motor controller may be configured with maximum velocity 800 to ensure that the motor is operated within a safe velocity range. For example, when the motor is configured to drive wheels of a vehicle, the velocity limit may correspond to a vehicle speed limit intended to ensure safe operation of the vehicle. The velocity speed limit in the forward direction may be the same as or different from the velocity speed limit in the reverse direction.

FIG. 8A illustrates the same commanded velocity profile 500 as illustrated in FIGS. 7A-7D. As described with respect to FIGS. 7A-7D, the motor may track the commanded velocity profile between time points t=0 and t=1 according to lines 700 and 702. However, during the time interval between time points t=1 to t=2, the motor may be predicted to reach the maximum velocity 800. Thus, instead of being predicted to follow the velocity indicated by lines 704 and 706 of FIGS. 7A and 7B, the motor may be predicted to follow the velocity indicated by lines 802, 806, and 810 in FIGS. 8A and 8B. In other words, the position-controlled motor controller may first drive the motor according to line 802 with the first maximum velocity in the first direction until the motor reaches the maximum velocity. The motor may then be driven at the maximum velocity according to line 806. Finally, the motor may be driven according to line 810 in the second direction until the motor reaches the target velocity.

In order to drive the motor with the target velocity 526 at time point t=2 when the motor is predicted to run into the maximum velocity limit 800, the control system may determine a first intersection point 804 between a first line 802 and the maximum velocity line 800. Additionally, the control system may determine a second intersection point 808 between the maximum velocity line 800 and a second line 810. The first line 802 may be defined as a line through a point corresponding to the starting velocity 524 and the starting time point t=1 and having a slope corresponding to the first maximum acceleration. The maximum velocity line 800 may be a horizontal line corresponding to the maximum velocity limit of the motor or the position-controlled motor controller. The second line 810 may be defined as a line through a point corresponding to the target velocity 526 and the target time point t=2 and having a slope corresponding to the second maximum acceleration.

Figure 8B:
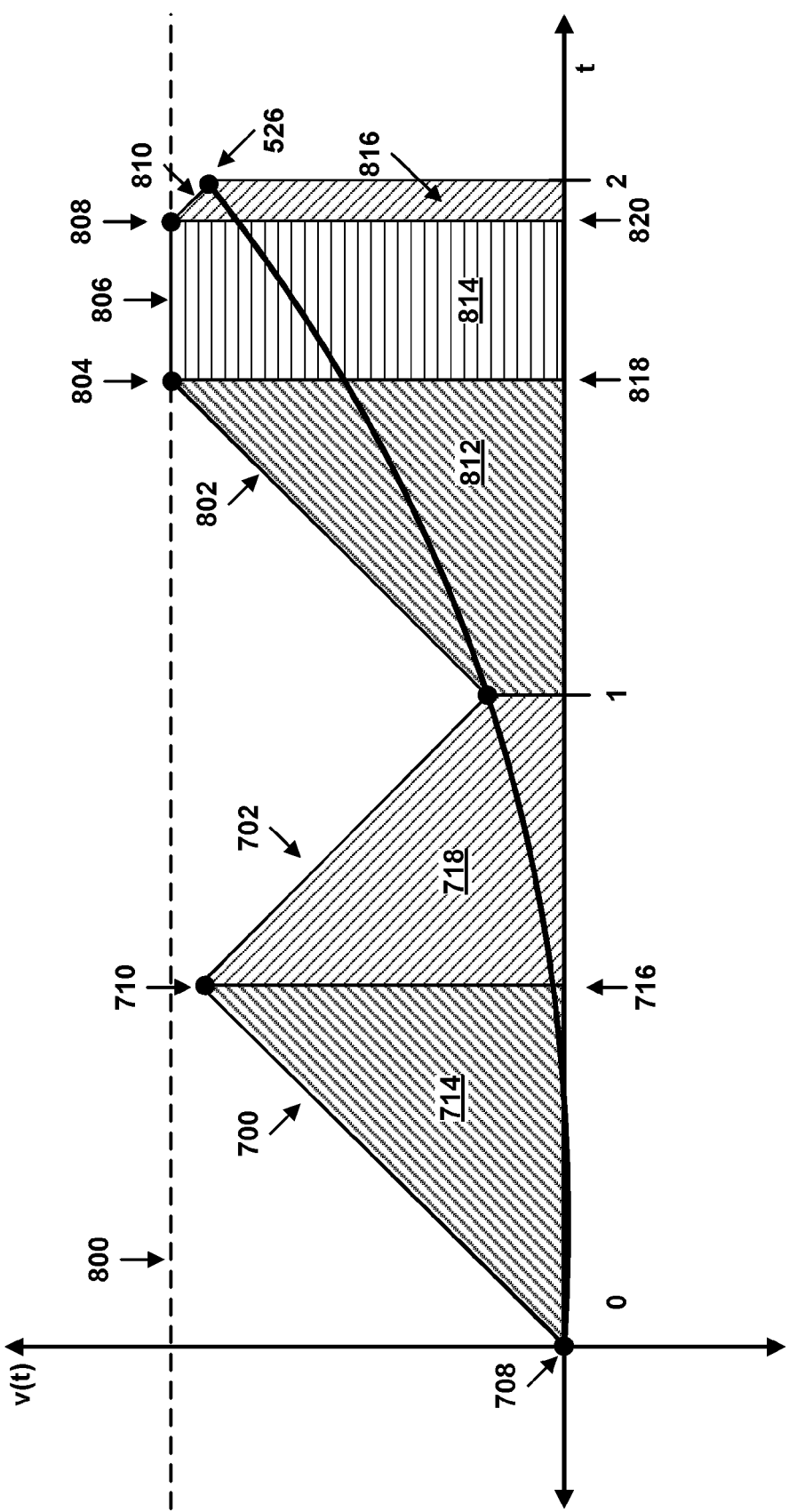
FIG. 8B illustrates integrals of a predicted motor velocity profile including a maximum motor velocity, according to an example embodiment.

The control system may then determine an integral 812 of the first line 802 between the starting time point t=1 and time point 818 corresponding to the intersection point 804, as shown in FIG. 8B. Specifically, the shaded area 812 may represent the integral of line 802 between time point t=1 and time point 818. Additionally, control system may determine an integral 814 of the maximum velocity line 800 between the time point 818 corresponding to the intersection point 804 and time point 820 corresponding to intersection point 808. Further, control system may determine an integral 816 of the second line 810 between the time point 820 corresponding to the intersection point 808 and the target time point t=2.

The target position may then be determined by the control system based on the sum of the determined integral 812 of the first line 802, the determined integral 814 of the maximum velocity line 800, and the determined integral 816 of the second line 810. Specifically the target position may be determined by adding integral 812, integral 814, and integral 816 to a current position of the motor. This target position may then be commanded to the position-controlled motor controller and may result in the position-controlled motor controller driving the motor with target velocity 526 at time point t=2.

A control system may perform the operations of FIGS. 8A and 8B as follows. The control system may determine a target velocity (e.g., velocity 526) and a time point (e.g., t=2) at which to reach the target velocity. The control system may then determine a first time interval during which the motor controller will drive the motor with the first maximum acceleration in the first direction (e.g., time interval between t=1 and time point 818). Additionally, the control system may determine a second time interval during which the motor controller will drive the motor with the maximum velocity in the first direction (e.g., time interval between 818 and 820). Further, the control system may determine a third time interval during which the motor controller will drive the motor with the second maximum acceleration in the second direction (e.g., interval between 820 and t=2). Yet further, the control system may determine a first double integral of the first maximum acceleration over the first time interval, an integral of the maximum velocity over the second time interval, and a second double integral of the second maximum acceleration over the third time interval. Finally, the control system may determine the target position based on the sum of the determined first double integral, the determined integral of the maximum velocity, and the determined second double integral.

The embodiments described with respect to FIGS. 6, 7A-7D, and 8A-8B might not be limited to using only the first maximum acceleration in the first direction and the second maximum in the second direction. The respective embodiments may determine the target positions that are predicted to produce the target velocities based on characteristic acceleration profiles that may include, in addition to the first maximum acceleration in the first direction and the second maximum in the second direction, acceleration profiles with which the position-controlled motor controller transitions between (i) zero acceleration and the first maximum acceleration, and vice versa, (ii) the first maximum acceleration to the second maximum acceleration, and vice versa, and (iii) the second acceleration to zero acceleration, and vice versa. For example, when transitioning from zero acceleration to the first maximum acceleration in the first direction, the acceleration profile may involve a gradual, linear increase of acceleration from zero to the first maximum acceleration. This gradual increase in acceleration may reduce or minimize motor jerk, thus resulting in a smooth velocity trajectory.

Specifically, in one embodiment, the characteristic acceleration profile may comprise, in addition to the first maximum acceleration and the second maximum acceleration, (i) a first transition profile between zero acceleration and the first maximum acceleration and (ii) a second transition profile between the first maximum acceleration and the second maximum acceleration. A first time interval may be determined during which the motor controller is predicted to drive the motor with the first maximum acceleration in the first direction. A second time interval may be determined during which the motor controller is predicted to drive the motor with the second maximum acceleration in the first direction. A third time interval may be determined during which the motor controller is predicted to drive the motor according to the first transition profile. A fourth time interval may be determined during which the motor controller is predicted to drive the motor according to the second transition profile.

Additionally, a first double integral may be determined of the first maximum acceleration over the first time interval. A second double integral may be determined of the second maximum acceleration over the second time interval. A third double integral may be determined of the first transition profile over the third time interval. A fourth double integral may be determined of the second transition profile over the fourth time interval. The target position may be determined based on the sum of (i) the first double integral, (ii) the second double integral, (iii) the third double integral, and (iv) the fourth double integral.

However, for simplicity, the embodiments of FIGS. 6, 7A-7D, and 8A-8B illustrate the target position determination process with the assumption that the position-controlled motor controller drives the motor with either the first maximum acceleration in the first direction or the second maximum in the second direction (e.g., both accelerations may be present within each characteristic time interval). However, the ideas illustrated with respect to FIGS. 6, 7A-7D, and 8A-8B are equally applicable to other linear and nonlinear acceleration profiles that may include the transition acceleration profiles described above. Specifically, the systems and operations herein described may determine the acceleration profile with which the position-controlled motor controller is predicted to drive the motor. The determined acceleration profile and/or sections thereof may be integrated as herein described to determine target positions that, when commanded to the position-controlled motor controller, are predicted to cause the motor controller to drive the motor with the target velocity at a target time point.

VIII. Conclusion

The embodiment described with respect to FIGS. 5A-5C involves driving the motor with either the first maximum acceleration in the first direction or the second maximum acceleration in the second direction during each characteristic time interval between time steps 0-21. In contrast, the embodiments described with respect to FIGS. 6, 7A-7D, and 8A-8B include operations that may utilize, the first maximum acceleration in the first direction, the second maximum acceleration in the second direction, as well as any transition accelerations during each time interval between time steps 0-21. In other words, while the embodiment of FIGS. 5A-5C selects, within each time interval, one acceleration that best approximates the target velocity, the embodiments of FIGS. 6, 7A-7D, and 8A-8B may combine, within each time interval, multiple acceleration profiles to reach, with higher certainty, the target velocity at each of the time points 0-21. Thus, the embodiments of FIGS. 6, 7A-7D, and 8A-8B may be more accurate at tracking the commanded velocity profile 500.

The present disclosure is not to be limited in terms of the embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
   determining a target velocity for a motor, wherein a position-controlled motor controller is configured to drive the motor to a commanded position with a characteristic acceleration profile;
   determining a target position that, when commanded to the motor controller, is predicted to cause the motor controller to drive the motor with the target velocity at a target time point by driving the motor with the characteristic acceleration profile; and
   providing an instruction for execution by the position-controlled motor controller, the instruction configured to cause the position-controlled motor controller to drive the motor to the target position.

2. The method of claim 1, wherein determining the target position comprises:
   determining an expected velocity profile that the motor is predicted to follow based on the characteristic acceleration profile of the position-controlled motor controller;
   determining an integral of the expected velocity profile; and
   determining the target position based on (i) the determined integral and (ii) a current position of the motor.

3. The method of claim 1, wherein the characteristic acceleration profile comprises:
   a first maximum acceleration in a first direction; and
   a second maximum acceleration in a second direction opposite to the first direction.

4. The method of claim 3, wherein determining the target position comprises:
   determining the target time point at which to reach the target velocity;
   determining a first time interval during which the motor controller is predicted to drive the motor with the first maximum acceleration in the first direction; and
   determining a second time interval during which the motor controller is predicted to drive the motor with the second maximum acceleration in the second direction, wherein (i) driving the motor with the first acceleration in the first direction during the first time interval and (ii) driving the motor with the second acceleration in the second direction during the second time interval is predicted to cause the motor to reach the target velocity at the target time point.

5. The method of claim 4, wherein determining the target position comprises:
   determining a first double integral of the first maximum acceleration over the first time interval;
   determining a second double integral of the second maximum acceleration over the second time interval; and determining the target position based on the sum of (i) the first double integral and (ii) the second double integral.

6. The method of claim 3, wherein determining the target position comprises:
    determining a starting velocity of the motor, wherein the starting velocity corresponds to a starting time point;
    determining a target time point at which to reach the target velocity;
    determining an intersection point between (i) a first line through a point corresponding to the starting velocity and the starting time point, the first line having a slope corresponding to the first maximum acceleration and (ii) a second line through a point corresponding to the target velocity and the target time point, the second line having a slope corresponding to the second maximum acceleration;
    determining an integral of the first line between the starting time point and a time point corresponding to the intersection point;
    determining an integral of the second line between the time point corresponding to the intersection point and the target time point; and
    determining the target position based on the sum of the integral of the first line and the integral of the second line.

7. The method of claim 3, wherein the characteristic acceleration profile additionally comprises (i) a first transition profile between zero acceleration and the first maximum acceleration and (ii) a second transition profile between the first maximum acceleration and the second maximum acceleration, wherein determining the target position comprises:
    determining a first time interval during which the motor controller is predicted to drive the motor with the first maximum acceleration in the first direction;
    determining a second time interval during which the motor controller is predicted to drive the motor with the second maximum acceleration in the first direction;
    determining a third time interval during which the motor controller is predicted to drive the motor according to the first transition profile;
    determining a fourth time interval during which the motor controller is predicted to drive the motor according to the second transition profile;
    determining a first double integral of the first maximum acceleration over the first time interval;
    determining a second double integral of the second maximum acceleration over the second time interval;
    determining a third double integral of the first transition profile over the third time interval;
    determining a fourth double integral of the second transition profile over the fourth time interval;
    determining the target position based on the sum of (i) the first double integral, (ii) the second double integral, (iii) the third double integral, and (iv) the fourth double integral.

8. A non-transitory computer readable storage medium having stored thereon instructions that, when executed by a computing device, cause the computing device to perform operation comprising:
    determining a target velocity for a motor, wherein a position-controlled motor controller is configured to drive the motor to a commanded position with a characteristic acceleration profile;
    determining a target position that, when commanded to the motor controller, is predicted to cause the motor controller to drive the motor with the target velocity at a target time point by driving the motor with the characteristic acceleration profile; and
    providing an instruction for execution by the position-controlled motor controller, the instruction configured to cause the position-controlled motor controller to drive the motor to the target position.

9. A system comprising:
    a motor;
    a position-controlled motor controller configured to drive the motor to a commanded position with a characteristic acceleration profile; and
    a control system configured to:
        determine a target velocity for the motor;
        determine a target position that, when commanded to the motor controller, is predicted to cause the motor controller to drive the motor with the target velocity at a target time point by driving the motor with the characteristic acceleration profile; and
        provide an instruction for execution by the position-controlled motor controller, the instruction configured to cause the position-controlled motor controller to drive the motor to the target position.

10. The system of claim 9, wherein the control system is configured to determine the target position by:
    determining an expected velocity profile that the motor is predicted to follow based on the characteristic acceleration profile of the position-controlled motor controller;
    determining an integral of the expected velocity profile; and
    determining the target position based on (i) the determined integral and (ii) a current position of the motor.

11. The system of claim 9, wherein the characteristic acceleration profile comprises:
    a first maximum acceleration in a first direction; and
    a second maximum acceleration in a second direction opposite to the first direction.

12. The system of claim 11, wherein the control system is configured to determine the target position by:
    determining the target time point at which to reach the target velocity;
    determining a first time interval during which the motor controller is predicted to drive the motor with the first maximum acceleration in the first direction; and
    determining a second time interval during which the motor controller is predicted to drive the motor with the second maximum acceleration in the second direction, wherein (i) driving the motor with the first acceleration in the first direction during the first time interval and (ii) driving the motor with the second acceleration in the second direction during the second time interval is predicted to cause the motor to reach the target velocity at the target time point.

13. The system of claim 12, wherein the control system is configured to determine the target position by:
    determining a first double integral of the first maximum acceleration over the first time interval;
    determining a second double integral of the second maximum acceleration over the second time interval; and
    determining the target position based on the sum of (i) the first double integral and (ii) the second double integral.

14. The system of claim 11, wherein the control system is configured to determine the target position by:
    determining a starting velocity of the motor, wherein the starting velocity corresponds to a starting time point;
    determining the target time point at which to reach the target velocity;

determining an intersection point between (i) a first line through a point corresponding to the starting velocity and the starting time point, the first line having a slope corresponding to the first maximum acceleration and (ii) a second line through a point corresponding to the target velocity and the target time point, the second line having a slope corresponding to the second maximum acceleration;

determining an integral of the first line between (i) the starting time point and (ii) a time point corresponding to the intersection point;

determining an integral of the second line between (i) the time point corresponding to the intersection point and (ii) the target time point; and determining the target position based on the sum of (i) the determined integral of the first line and (ii) the determined integral of the second line.

15. The system of claim 9, wherein the control system is configured to determine the target velocity for the motor by:
receiving a velocity profile;
discretizing the velocity profile into a plurality of discrete velocity points corresponding to a plurality of time points, wherein the plurality of time points are based on a frequency with which the control system is configured to communicate with the position-controlled motor controller; and
selecting as the target velocity a first velocity point of the plurality of discrete velocity points, wherein the first velocity point corresponds to a smallest time point of the plurality of time points.

16. The system of claim 15, wherein the control system is configured to determine the target velocity for the motor by:
periodically updating (i) the target velocity with consecutive velocity points of the plurality of discrete velocity points and (ii) the target time point with consecutive time points of the plurality of time points, wherein the consecutive velocity points correspond to the consecutive time points following the smallest time point corresponding to the first velocity point.

17. The system of claim 9, wherein the motor is a first motor configured to rotate a wheel of a vehicle about a drive axis of the wheel, wherein the position-controlled motor controller is a first position-controlled motor controller configured to drive the first motor to the commanded position with a first characteristic acceleration profile, and wherein the target velocity is a first target velocity, the system further comprising:
a second motor configured to rotate the wheel of the vehicle about a steering axis of the wheel of the vehicle to control a direction of travel of the vehicle; and
a second position-controlled motor controller configured to drive the second motor to a commanded position with a second characteristic acceleration profile, wherein the control system is further configured to coordinate velocities of the first motor and the second motor to cause the vehicle to follow a path through an environment by:
determining a second target velocity for the second motor in coordination with the determined first target velocity for the first motor;
determining a second target position that, when commanded to the second motor controller, is predicted to cause the second motor controller to drive the second motor with the second target velocity at the target time point by driving the second motor with the second characteristic acceleration profile; and
providing an additional instruction for execution by the second position-controlled motor controller, the additional instruction configured to cause the second position-controlled motor controller to drive the second motor to the second target position.

18. The system of claim 9, wherein:
the position-controlled motor controller comprises a feedback loop operating at a first frequency; and
the control system is configured to provide instructions to the position-controlled motor controller at a second frequency lower than the first frequency.

19. The system of claim 9, wherein the characteristic acceleration profile of the position-controlled motor controller is modifiable, wherein the characteristic acceleration profile is a first characteristic acceleration profile, and wherein the control system is further configured to:
determine that an acceleration between a current motor velocity and the target motor velocity exceeds a maximum acceleration of the first characteristic acceleration profile;
determine a second characteristic acceleration profile having a maximum acceleration greater than the maximum acceleration of the first characteristic acceleration profile; and
provide instructions to the position-controlled motor controller to configure the position-controlled motor controller to drive the motor to the commanded position with the second characteristic acceleration profile.

20. The system of claim 9, wherein the position-controlled motor controller is configured to drive the motor with a maximum velocity, wherein the target velocity for the motor is greater than the maximum velocity, and wherein the control system is further configured to determine the target position that causes the motor controller to drive the motor with the target velocity by:
determining the target time point at which to reach the target velocity;
determining a first time interval during which the motor controller is predicted to drive the motor with the first maximum acceleration in the first direction;
determining a second time interval during which the motor controller is predicted to drive the motor with the maximum velocity in the first direction;
determining a third time interval during which the motor controller is predicted to drive the motor with the second maximum acceleration in the second direction;
determining a first double integral of the first maximum acceleration over the first time interval;
determining an integral of the maximum velocity over the second time interval;
determining a second double integral of the second maximum acceleration over the third time interval; and
determining the target position based on the sum of (i) the determined first double integral, (ii) the determined integral of the maximum velocity, and (iii) the determined second double integral.

\* \* \* \* \*